US000001801H

United States Statutory Invention Registration [19]

[11] Reg. Number: H1,801

Browning et al.

[45] Published: Sep. 7, 1999

[54] SWITCHING MODULE FOR A TELECOMMUNICATIONS SWITCHING PLATFORM

[75] Inventors: Mark D. Browning, Bartlett; James M. Davis, Germantown; Cecil W. Johnson, Jr.; Scott Arthur Kooy, both of Memphis; H. John Lohn, III, Collierville; R. Timothy Wallace, Bartlett, all of Tenn.

[73] Assignee: DSC/Celcore, Inc., Plano, Tex.

[21] Appl. No.: 09/025,740

[22] Filed: Feb. 19, 1998

Related U.S. Application Data

[60] Provisional application No. 60/060,107, Sep. 26, 1997.

[51] Int. Cl.[6] ..... H04M 1/00

[52] U.S. Cl. ..... 379/9

[56] References Cited

U.S. PATENT DOCUMENTS

| | | | |
|---|---|---|---|
| 5,487,101 | 1/1996 | Fletcher | 379/60 |
| 5,521,961 | 5/1996 | Fletcher et al. | 379/59 |
| 5,623,532 | 4/1997 | Houde et al. | 379/58 |
| 5,627,881 | 5/1997 | Fletcher | 379/60 |

OTHER PUBLICATIONS

Steve Chen, "*Hybrid MicroSystems: The Ultimate Flexibility in Cellular Applications*", 1996, pp. 1–16, Celcore, Inc., Memphis, Tennessee.

"*GlobalHub Mobility Manager—Enables "One Number" PCS Service Via Motorola PPS Residential Products*" pp. 1–2, Celcore, Inc., Memphis, Tennessee, 1996.

"*IS–41 Network Hub—The Mobility Manager for Celcore's GlobalSystem*" pp. 1–2, Celcore, Inc., Memphis, Tennessee, 1996.

"*GlobalHub*" pp. 1–10, Celcore, Inc., Memphis, Tennessee, 1996.

John Scourias, "*Overview of the Global System for Mobile Communications*", Mar. 27, 1996, pp. 1–16, John Scourias.

Martin A. Iroff & Steve Chen, "A distributed GSM Architecture for Low–Traffic Density Markets", *Mobile Communications International*, Oct. 1996, pp. 1–3, IBC Business Publishing, London, England.

Information pamphlet, Feb. 1997, pp. 1–7, Version 1.0, Celcore, Inc., Memphis, Tennessee.

"*BS–20/BS–21, D900/D1800 Base Transceiver Station*", pp. 1–2, Geschaftszweig Mobilfunknetze, Munchen, Germany, 1997.

"*ICs for Communications—Memory Time Switch Large MTSL*" Mar. 1995, pp. 1–15, Version 2.1, Siemens AG, Munchen, Germany.

"*ICs for Communication—Multipoint Switching and Conferencing Unit—Attenuation MUSAC–A*" Feb. 1996, pp. 1–68, Version 1.2, Siemens AG, Munchen, Germany.

"*ICs for Communications—Multichannel Network Interface Controller for HDLC MUNICH32*" Jan. 1996, pp. 1–252, Version 3.2, Siemens AG, Munchen, Germany.

"*Unique Solutions to Complex Challenges of Wireless Carriers*" pp. 1–9, Celcore, Inc., Memphis, Tennessee.

*Primary Examiner*—Daniel T. Pihulic
*Attorney, Agent, or Firm*—John G. Flaim

[57] ABSTRACT

A switching module capable of sending heartbeat messages and identifying other elements within a telecommunications switching platform as operational over one bus or both buses of a redundant-pair control bus. The module also has a reprogrammable, nonvolatile memory associated with it from which it can run its operating system. The module can also transfer the operating system into another memory, allowing the module to make updates to the operating system stored in the nonvolatile memory without interrupting its execution of its run-time operating code.

27 Claims, 9 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

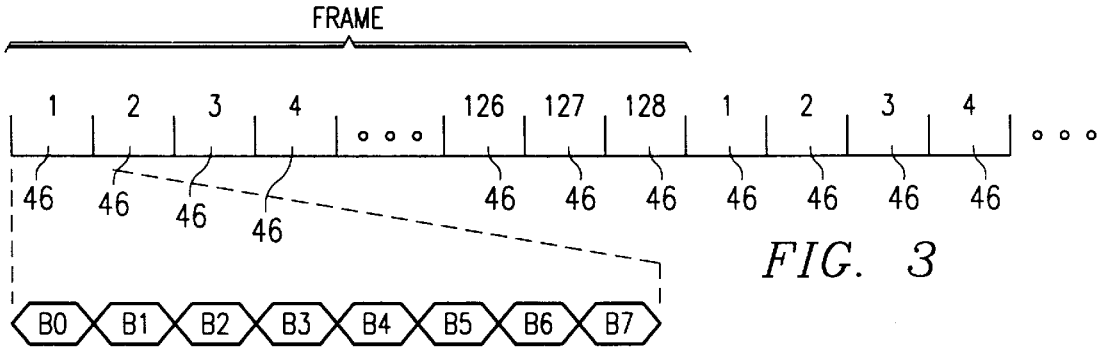
FIG. 3
FIG. 5
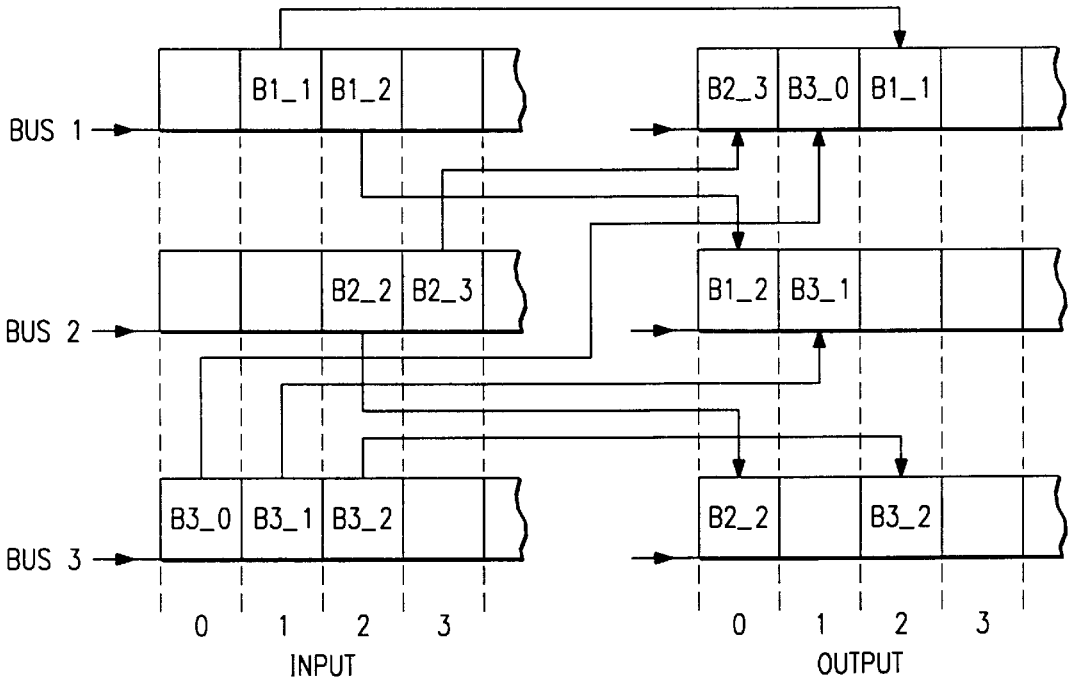

SWITCHING MODULE FOR A TELECOMMUNICATIONS SWITCHING PLATFORM

CLAIM OF PRIORITY

The instant patent application claims priority from the U.S. provisional patent application designated with Ser. No. 60/060,107, entitled "Cellular Communication System," naming Anthony G. Fletcher and Scott D. Hoffpauir as inventors, and which was filed on Sep. 26, 1997.

RELATED PATENT APPLICATIONS

The instant patent application is related to the following patent applications: (a) the U.S. patent application Ser. No. 09/026,467 designated by DSC Case No. 840-00 and Attorney Docket No. 24194000.185, entitled "Fault Testing in a Telecommunications System," naming H. John Lohn III and Sarvesh Asthana as inventors, and which was filed concurrently with the instant application; (b) the U.S. patent application Ser. No. 09/026,229 designated by DSC Case No. 841-00 and Attorney Docket No. 24194000.186, entitled "System and Method for Dynamically Mapping Components Within a Telecommunications Switching Platform," naming H. John Lohn III as inventor, and which was filed concurrently with this application; (c) the U.S. patent application Ser. No. 09/026,485 designated by DSC Case No. 847-00 and Attorney Docket No. 24194000.192, entitled "Span Interface Module for a Telecommunications Switching Platform," naming Mark D. Browning, Cecil W. Johnson, Jr., Scott A. Kooy, H. John Lohn III, and R. Timothy Wallace as inventors, and which was filed concurrently with this application; (d) the U.S. patent application Ser. No. 09/026,488 designated by DSC Case No. 848-00 and Attorney Docket No. 24194000.193, entitled "Signal-Processing Module for a Telecommunications Switching Platform," naming Mark D. Browning, James M. Davis, Cecil W. Johnson, Jr., Scott A. Kooy, H. John Lohn III, and R. Timothy Wallace as inventors, and which was filed concurrently with this application; (e) the U.S. patent application Ser. No. 09/026,321 designated by DSC Case No. 849-00 and Attorney Docket No. 24194000.194, entitled "Telephony-Support Module for a Telecommunications Switching Platform," naming Mark D. Browning, Cecil W. Johnson, Jr., Scott A. Kooy, H. John Lohn III, Shawn W. Vines, and R. Timothy Wallace as inventors, and which was filed concurrently with this application; (f) the U.S. patent application Ser. No. 09/026,486 designated by DSC Case No. 851-00 and Attorney Docket No. 24194000.196, entitled "System and Method for Forming Circuit Connections within a Telecommunications Switching Platform," naming James M. Davis, Scott A. Kooy, and H. John Lohn III as inventors, and which was filed concurrently with this application.

FIELD OF THE INVENTION

This invention generally relates to telecommunications systems and more particularly to mobile and land-based telecommunications switching platforms.

BACKGROUND

Telecommunications switching platforms operate to connect incoming communication channels to selected outgoing communication channels. This switching is generally done in response to phone numbers dialed by the users or subscribers of the company operating the telecommunications system, or by others who are calling these subscribers. For example, the caller enters a phone number and signaling is sent along with or over the communication channel and the telecommunication system attempts to establish an end-to-end communications link to the destination number that the caller has dialed.

An end-to-end communications channel is established through a switch within the telecommunications switching platform. This switch is typically a non-blocking matrix switch, which is operable to connect the incoming channel to one of many outgoing channels. The switch operates under control of a processor within the telecommunications switching platform. The processor supplies information that the switch uses to connect one information channel to another through the switch. Typically, the switch receives a number of time-multiplexed input signals and provides a number of time-multiplexed output signals. There are also typically a number of resources within the switching platform. These resources may be connected to each other or to an information channel through the switch. For example, if the caller seeks to initiate a call to a busy number, the caller must receive a busy signal; this busy signal is provided by a resource within the telecommunications switching platform, and the familiar busy tone is passed through the switch and received by the caller.

In the event that a resource within the telecommunication switching platform fails or is added or removed from the system while the system is operating, prior-art systems have failed to detect such failure or insertion or extraction. Thus, such systems are unable to be easily configured or reconfigured.

In prior-art telecommunications switching platforms, a number of processors or controllers may be implemented to perform the numerous functions of the platforms. In such cases, each of the processors typically has an operating system associated with it. Prior-art systems have typically required that the operating system be downloaded into volatile memory from a high-level operating system, which might have its own associated nonvolatile semiconductor memory or hard disk drive.

SUMMARY OF THE INVENTION

The present invention overcomes the problems associated with prior-art systems by providing a system and method for determining when a system resource has failed or been removed or inserted into an operating telecommunications switching platform. The present invention also provides for a system and method in which each of the switching modules has a reprogrammable, nonvolatile memory associated with it that has the module's operating system stored in it.

A system in current operation is sometimes referred to as "hot," and thus the removal or reinsertion of a resource or module in such a system may be referred to herein as a "hot removal" or a "hot insertion.

The switching modules communicate with other elements of the telecommunication switching platform through a control bus, which preferably comprises a pair of redundant control buses. Communications over the control bus is through a Local COMmunication (LCOM) protocol.

To monitor for, among other things, resource module failures, "hot insertions," and "hot removals," the LCOM protocol provides for a heartbeat messaging scheme. In one embodiment, this messaging scheme provides that one group of resource modules will use one of the redundant control buses as a primary bus, and that the other group of resource modules will use the other of the redundant control buses as a primary bus. Whichever group of resource modules uses one of these redundant buses as a primary bus will use the other of the redundant buses as a secondary bus.

The switching module's LCOM controller, within a first time period, sends a primary heartbeat message over both of the redundant control buses. The buses are individually addressed by use of an LCOM header. Supposing that one of the buses is referred to as Bus A and the other as Bus B, then there will be a "broadcast A" value placed in the LCOM header of the LCOM heartbeat message intended to be broadcast over Bus A and a "broadcast B" value placed in the LCOM header of the LCOM heartbeat message intended to be broadcast over Bus B. This process is preferably referred to herein as "primary heartbeat messaging."

The LCOM controller also preferably performs a type of heartbeat messaging known as "secondary heartbeat messaging." With the secondary heartbeat messaging, the LCOM controller preferably cycles through all known resource modules in the switching platform, by placing certain "slot IDs" in the LCOM header of each secondary heartbeat message. The LCOM controller then cycles through the known slots of the platform, making sure that each interface module is also capable of communicating over its secondary bus.

To allow for more efficient system power-up, the switching modules of the present invention preferably have their operating systems stored in a nonvolatile memory that can be reprogrammed without removing it from the system. For instance, the nonvolatile memory might be a Flash memory, an Electrically Erasable Programmable Read-Only Memory (EEPROM) or it might be a battery-backed Static Random Access Memory (SRAM), or it might another type of nonvolatile, reprogrammable memory. By keeping the operating system in a nonvolatile memory associated with the switching module, the preferred embodiment platform eliminates the need for a time-consuming download of operating system code into a large number of volatile memories associated with the switching modules and other modules in the platform. Instead, each module powers-up ready-to-operate with its own operating code. Then, if necessary, perhaps while the platform is already up and operating, new operating system code can be downloaded and programmed into the nonvolatile memory of the module without interruption to the system or delay in the system power-up.

BRIEF DESCRIPTION OF THE DRAWINGS

FIG. 3 is a timing diagram illustrating the multiplexing of telecommunications channels upon the high-speed buses of FIG. 2;

FIG. 5 is timing diagram for several high-speed buses, illustrating the switching task performed by the switching module of the telecommunications switching platform;

Figure 1:
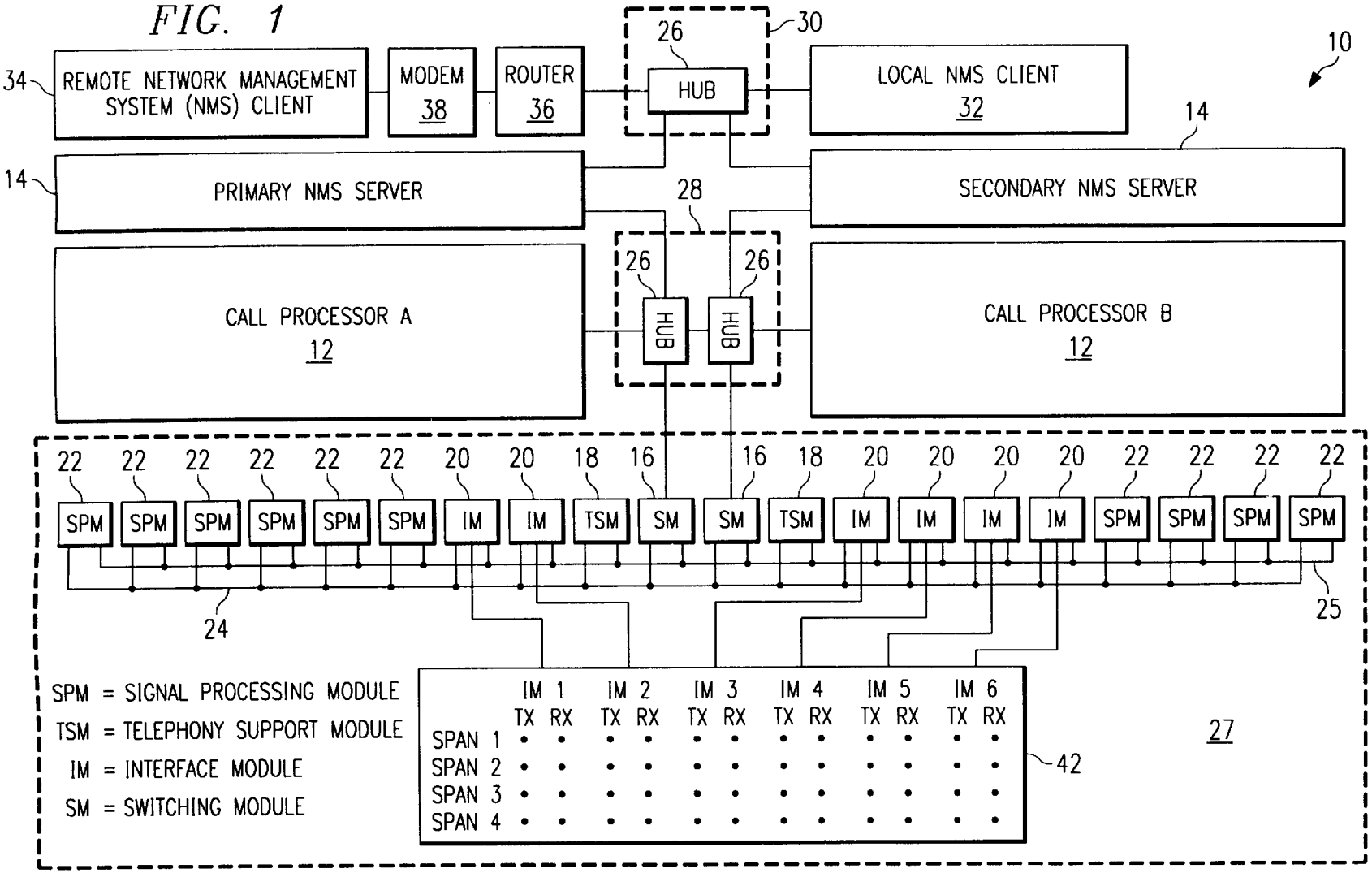
FIG. 1 is a block diagram of an embodiment of the claimed telecommunications switching platform.

All of these drawings are drawings of certain embodiments of the invention. The scope of the invention is not limited to the specific embodiments illustrated in the drawing and described below. Instead, the scope of the invention is set forth in the claims.

DETAILED DESCRIPTION OF EMBODIMENTS

FIG. 1 is a block diagram of an embodiment of the present invention. This block shows the overall telecommunications-switching platform 10. This switching platform 10 includes redundant call processors 12 and Network Management System ("NMS") servers 14 as well as switching modules 16 and resource processors 18,20,22 that carry out a number of the lower-level tasks to be accomplished by the switching platform 10. Resource processors include, for example, a telephony-support module 18, an interface module 20, and a signal-processing module 22. The resource processors are described below, and are described in further detail in U.S. patent application Nos.: 09/026,485 (Docket No. 24194000.192), entitled "Span Interface Module for a Telecommunications Switching Platform"; 09/026,488 (Docket No. 24194000.193), entitled "Signal-Processing Module for a Telecommunications Switching Platform"; 09/026,321 (Docket No. 24194000.194), entitled "Telephony-Support Module for a Telecommunications Switching Platform," all of which were filed on Feb. 19, 1998 and are hereby incorporated by reference herein.

The switching modules 16 and resource processors 18,20, 22 communicate with each other through, for example, a control bus 24. Data is passed between these same elements over high-speed data buses 25, which are preferably time-multiplexed serial data buses. The operation of these high-speed data buses 25 will be described in greater deal in FIGS. 2–3 and the text accompanying these figures.

Still referring to FIG. 1, the switching modules 16 preferably communicate with higher-level functional elements (the call processors 12, for example) within the platform 10 through communication hubs 26. In an embodiment of the present invention, logical communication paths are made between the resource processors 18,20,22 and the higher-level functional elements via the switching module 16 through, for example, TCP/IP sockets through the communication hubs 26.

The communication hubs 26 connect the call processors 12 to the switching modules 16 and the NMS servers 14. Preferably, there are two distinct LANs 28,30 within the call processor 12. The first LAN 28 connects the redundant call processors 12 to the redundant NMS servers 14 and redundant switching modules 16 through redundant communication hubs 26. The second LAN 30 can connect the redundant NMS servers 14 to local NMS clients 32 and/or remote NMS clients 34. Connection to remote NMS clients 34 is preferably performed through a router 36 and a modem 38. Since there is no direct NMS client access to the first LAN 28 on which the call processors 12, the switching modules 16, or the resource processors 18,20,22 operate, the NMS servers 14 may serve as "firewalls" against hacker intrusion into the switching platform 10.

With further reference to FIG. 1, the interface modules 20 connect externally to telecommunication spans 40 (see FIG.

2), which are, for example, industry-standard T1 or E1 spans each carrying a number of information channels as specified by the particular standard. These information channels may be telecommunications traffic channels or telecommunications control channels, as will be discussed below. Connection to the spans are made through span signal paths 41 from the interface modules to a span connector panel 42, which is the point at which the telecommunication spans 40 (see FIG. 2) physically connect to the switching platform 10.

Collectively, the switching modules 16, resource processors 18,20,22, control buses 24, high-speed buses 25, span signal paths 41, and span connector panel 42 are referred to as the Input/Output Sub-System ("IOSS") platform 27. In one embodiment of the present invention, the IOSS platform 27 resides on a single shelf within a telecommunications equipment rack and performs the lower-level functions within the telecommunications switching platform 10

Control bus 24 preferably comprises a pair of redundant control buses 24, over which the various resource processors 18,20,22 communicate using, for example, a Local COMmunication (LCOM) protocol. Although high-speed data buses 25 are sometimes referred to as PCM buses, where PCM stands for Pulse Code Modulation, which is a digital voice encoding standard, the data carried on them may include control information, signaling information, data information, and voice information encoded using other standards. For example, voice information that has been encoded by a Global Standard for Mobile Communication (GSM) system are encoded using a certain type of Linear Predictive Coding (LPC).

Communication hubs 26 are preferably Ethernet Local Area Network (LAN) communication hubs, although the hubs 26 may be hubs for other local networking protocols such as, for example, Token Ring or StarLAN. The communication hubs 26 and protocols may operate using either wired or wireless connection schemes. Although the resource processors 18,20,22 preferably communicate with higher-level functional elements in the system through the switching module 16 via Transmission Control Protocol/Internet Protocol ("TCP/IP") sockets through the communication hubs 26, other networking protocols are possible. It is also possible, for example, to have such resource processors 18,20,22 directly connected to the higher-level elements in the system such that they will be directly addressed by these high-level elements using data and address buses.

"Lower-level" functions, which are described above as being performed by the IOSS platform 27 might be defined, for instance, as all functions within the Open System Interconnection ("OSI") framework as being below the Session Layer (Layer 4). Under such a division, the IOSS platform 27 would be responsible for communications routing and end-to-end delivery of information, including error recovery and flow control.

Figure 2:
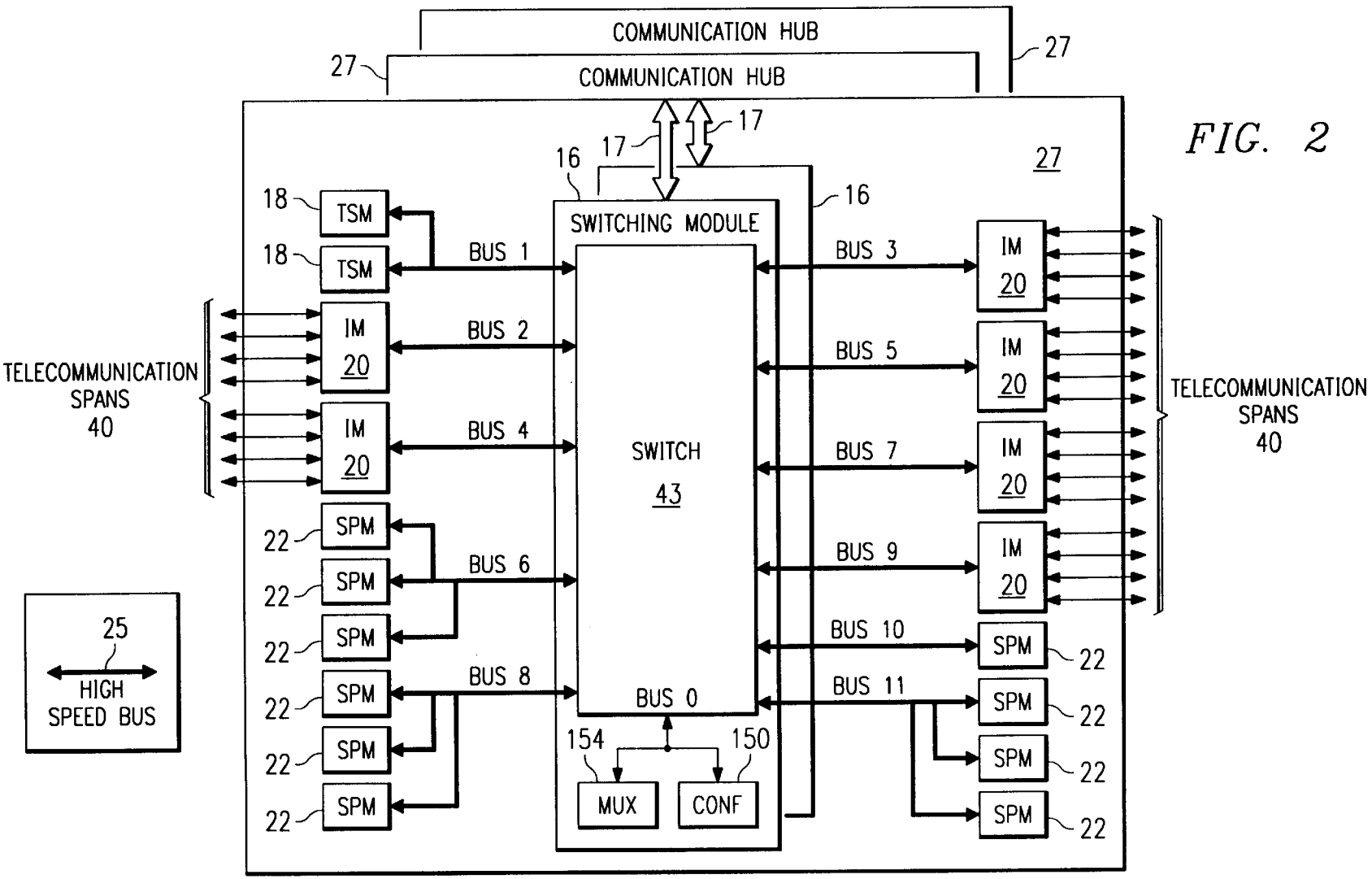
FIG. 2 is a block diagram of lower-level functional elements within the telecommunications switching platform of FIG. 1.

FIG. 2 is a block diagram of lower-level functional elements within a telecommunications switching platform 10. At the center of this block diagram are the redundant switching modules 16, which connect to the higher-level functional elements in the platform 10 through the communication hubs 26. In this embodiment, all communications between the higher-level functionality and the resource processors 18,20,22 are routed through, for example, the active, or ONLINE, switching module 16 instead of the inactive or OFFLINE one of the redundant switching modules 16.

The switching module 16 performs a number of functions. For example, one function of the switching module 16 is switching the telecommunication information channels arriving into the platform 10 through the telecommunications spans 40. As shown in FIG. 2, telecommunication spans 40 are connected to the interface modules 20. Information channels are transmitted within the spans 40 through, for example, time division multiplexing. The switching module 16 contains switches 43, which are responsible for making the connections between information channel inputs and information channel outputs according to commands from the higher-level functionality within the platform such as the call processor 12. The software function within the call processor 12 that controls switching of the information channels at the applications layer may be called the Resource Manager.

The switching platform 10 is also operable to, for example, receive from and transmit to GSM-standard mobile phones. Under the GSM standard, wireless voice channels are transmitted at 16 kbps ("kbps"), using LPC coding, whereas under many land-based telephony standards voice channels are transmitted at 64 kbps using PCM coding. Thus, in order to connect a mobile caller to a land-based called party, it is necessary to adapt the rate of the 16 kbps GSM voice channel to the land-based 64 kbps standard. This rate conversion is accomplished by, for example, a signal processing module 22.

With continued reference to FIG. 2, a GSM Base Transceiver Station (BTS) 44 (see FIG. 4) transmits four GSM voice channels on a 64 kbps DSO information channel. The telecommunications switching platform 10 connects the 64 kbps DSO channel from the BTS 44 to a signal-processing module 22 so that the signal-processing module 22 can convert this DSO information channel into four discrete 64 kbps PCM-encoded channels. These four 64 kbps information channels are then switched to four different information channels. The final switching of four channels to four different channels will accomplish the end-to-end switching, or will connect one or more of the GSM voice channels to one of the telephony support functions (such as dial tones or tone generation or tone decoding).

Since voice connections are bi-directional or full-duplex, the connection process described above is carried out in the reverse order to receive signals from the land-based information channels. Thus, the switching module 16 connects one 64 kbps DSO channel to the signal-processing module 22, then connects the four 64 kbps channels outputs from the signal-processing module 22 to four different 64 kbps information channels, and these connections are duplicated in the reverse direction, for a total of 10 switch connections.

Still referring to FIG. 2, connection is made between the information channels and the resource processors 18,20,22 and the switching modules 16 through a series of high-speed buses 25. As shown in FIG. 2, there are a total of 12 such buses used in this embodiment. For future capacity expansion, spare high-speed buses 25 may be included within the telecommunications rack and switch 43 may be configured to switch information channels on these additional buses. This embodiment includes four such spares, for a total of 16 high-speed buses. Each of these buses 25 operate at an exemplary data rate of 8.192 megabits per second ("Mbps"), which gives each bus 25 a capacity for 4 E1 spans, each E1 span having a bit rate of 2.044 Mbps. Each of these buses 25 is logically subdivided into 128 timeslots 46 (see FIG. 3). Each of these 128 timeslots 46 may be, for example, a 64 kbps channel. To share each of these buses between the various resources within the telecommunications switching platform 10, each resource or incoming information channel is assigned a certain position or timeslot within the buses 25 to which they are attached. The present invention, as set forth in certain of the claims hereinbelow, includes a novel method for assigning, maintaining, and utilizing the assignment of these timeslots 46 (see FIG. 3) to the various resources and information channels within the platform 10.

The switching module 16 uses a switch 43 to make connections between a timeslot 46 on one bus 25 to a different timeslot 46 on that same bus 25 or another bus 25. In an embodiment of the present invention, the switching module 16 is capable of connecting any of 2048 inputs to 2048 outputs. All of these connections can preferably be maintained simultaneously. The resources used within the switching platform 10 may be dynamically assigned based on system needs. As mentioned, the interface modules 20 form the entry and exit points for telecommunications spans 40 that are connected to the switching platform 10. Each of these interface modules 20 is capable of handling, for example, four E1 spans 40. Each E1 span may be comprised of 32 channels including 30 voice channels transmitted at 64 kbps, one 64 kbps framing channel, and one 64 kbps signaling channel. There are a total of six interface modules 20 shown in FIG. 2, each of which is preferably capable of handling four spans 40.

The switch 43 is preferably a Time-Space-Time switch, which is a space switch (i.e., a matrix switch) interposed between two time switches.

Figure 8:
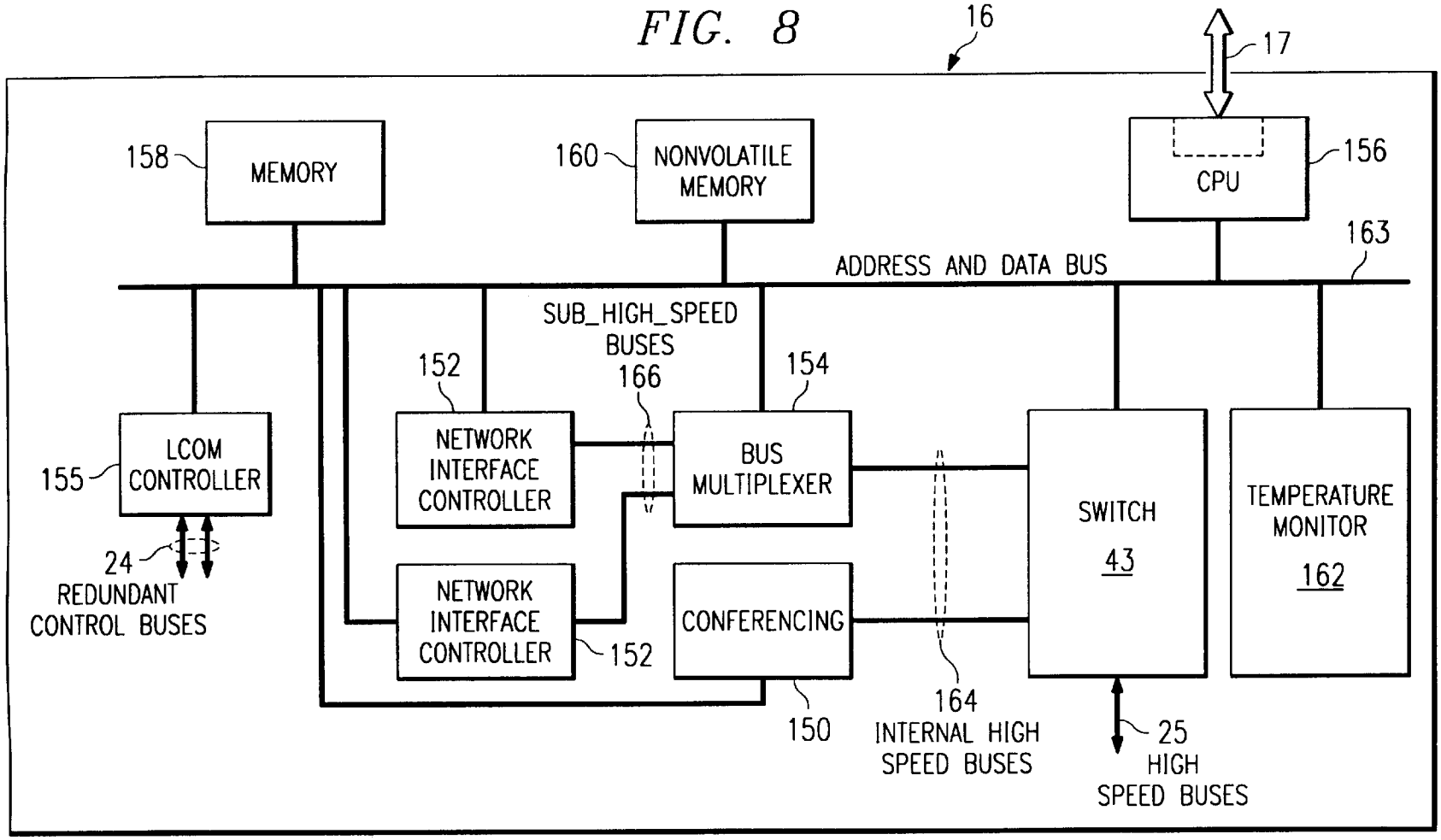
FIG. 8 is a block diagram of the switching module of FIGS. 1–2.

FIG. 8 provides an exemplary block diagram of the switching module 16. In this embodiment, the switching module 16 provides functions such as, for example, switching (SWTH task 70, see FIG. 6); conferencing; data communication; local communications (LCOM task 74, see FIG. 6); remote LAP-D communications (RLPD task 66, see FIG. 6); and an Ethernet interface.

FIG. 8 shows the switching module 16 from a hardware perspective. The switch 43 in this embodiment is, for example, a 2048 by 2048 memory timeslot, non-blocking switch implementation. The switch 43 may be, for instance, a Time-Slot Interchange Random Access Memory (TSIRAM). The switch 43 operates to receive and transmit over a number of high-speed buses 25, making timeslot cross connections from one timeslot of one high-speed bus 25 to a different timeslot within the same high-speed bus 25 or another high-speed bus 25, as was discussed with respect to FIG. 3. It is possible to accomplish this function using, for example, four SIEMENS Memory Time Switch Large (MTSL-16) components, although other components may provide the same function. All timeslot cross connections preferably take place within this switch 43. This will provide capacity for sixteen high-speed buses 25 (e.g., 8.192 Mbps buses) to interconnect modules on the backplane along internal components of the switching module 16. Each 8.192 Mbps bus 25 provides one hundred and twenty-eight 64 kbps timeslots.

The Remote LAPD (RLPD) data function preferably comprises 32 communications channels and is implemented with network interface controllers 152 and a bus multiplexer 154. Like other information channels and resources, these RLPD channels have logical identifiers or LCIs associated with them. The Resource Manager uses this logical identifier information to route the RLPD channels. This function is implemented in this embodiment using a Siemens MUlti-channel Network Interface Controller (MUNICH32) for the network interface controllers 152 and a MUSAC-A in switch mode as a bus multiplexer 154. Any or all of the 32 channels are connected to the proper paths through the switch 43. Each channel can support 64 Kbps or sub-rate (i.e., less than 64 Kbps) data rates. These channels are preferably used for any type of HDLC-based communications required of the system.

Still referring to FIG. 8, the Local Communications Function 74 preferably comprises a point-to-multipoint control bus link 24 between the switching module 16 and the resource processors 18,20,22. This function is preferably provided by a LCOM controller 155, which may, for example, be a SIEMENS Enhanced Serial Communications Controller (ESCC2), although other components are commercially available to serve this local communication function. A second link 24 is provided for redundancy. This bus 24 provides part of the communication path between the applications processor 12 and modules local to the backplane 16,18,20,22. The switching module 16 completes the path to the applications processor through local communication network 28. The switching module uses this same network 28 for its communication path to the application processor 12. The local communication (LCOM) software task 74 is represented on FIG. 6, and is executed on the switching module 16.

The network 28 is preferably an Ethernet LAN, connected through a 10BaseT connector on the front of the switching module 16 which is implemented, for example, using a MOTOROLA Enhanced Ethernet Transceiver (EET) and an Ethernet controller that is integrated into the switching module controller 156. The controller 156 additionally provides supervisory control of all the tasks that execute on the switching module 16. Additionally provided, either integrated within the controller 156 or as components connected thereto (as shown in FIG. 8), are a memory 158 and a nonvolatile memory 160. The memory 158 preferably stores run-time code and data, and is preferably a Dynamic Random Access Memory (DRAM) having a capacity of at least 4 Megabytes. The nonvolatile memory 160 preferably stores a non-volatile backup copy of the run-time memory and is preferably a FLASH memory having at least 2 Megabytes storage. The nonvolatile memory 160 may contain hardware write-protected blocks of code for boot up. The runtime code can be downloaded and upgraded remotely, whereas preferably the boot code can be upgraded only after on-site removal of the hardware boot_block_protection feature. This protection is implemented in this way to protect the reliability of operation of the switching 16 module in the event of power failure during runtime code updates. A temperature monitor 162 may be provided to alarm upon ambient temperature thresholds being exceeded.

With further reference to FIG. 8, the switching module 16 contains previously-described external connections, which are the redundant control buses 24, the high-speed buses 25, and the network connection 17. The switching module 16 also contains an internal address and data bus 163, through which the switching module controller 156 can access the memories 158,160 that are internal to the switching module 16. The switching module 16 also contains an internal high-speed bus 164, which may, for instance, be used to implement conferencing and LAPD functionality through communications with the conferencing unit 150 and the bus multiplexer 154. The bus multiplexer 154 may in turn be connected to the network interface controllers 152 through sub-high-speed buses 166. The switching module 16 may be implemented with either a single network interface controllers 152, or, depending on system capacity a second network interface controller 152 may be used to allow the switching module 16 to handle up to 64 RLPD channels. These sub-high-speed buses 166 are preferably high-speed serial LAP-D buses operating at approximately 2 Mbps, although these buses may also be implemented with a higher or lower data rate than is used in the other high-speed data bases 25,164.

FIG. 3 shows how telecommunications channels may be multiplexed onto a single high-speed bus 25. In this embodiment, 128 traffic and/or information channels are multiplexed together to form a single frame that repeats every 125 μs. Each of the timeslots 46, which are numbered 1 through 128 in FIG. 3 and begin repeating again after 128 timeslots, preferably comprises a group of eight contiguous bits occurring every 125 μs. These repeating groups of bits are designated in the exemplary timeslot 1 (as shown by the break-out figure for that timeslot) as B0 through B7.

Figure 4:
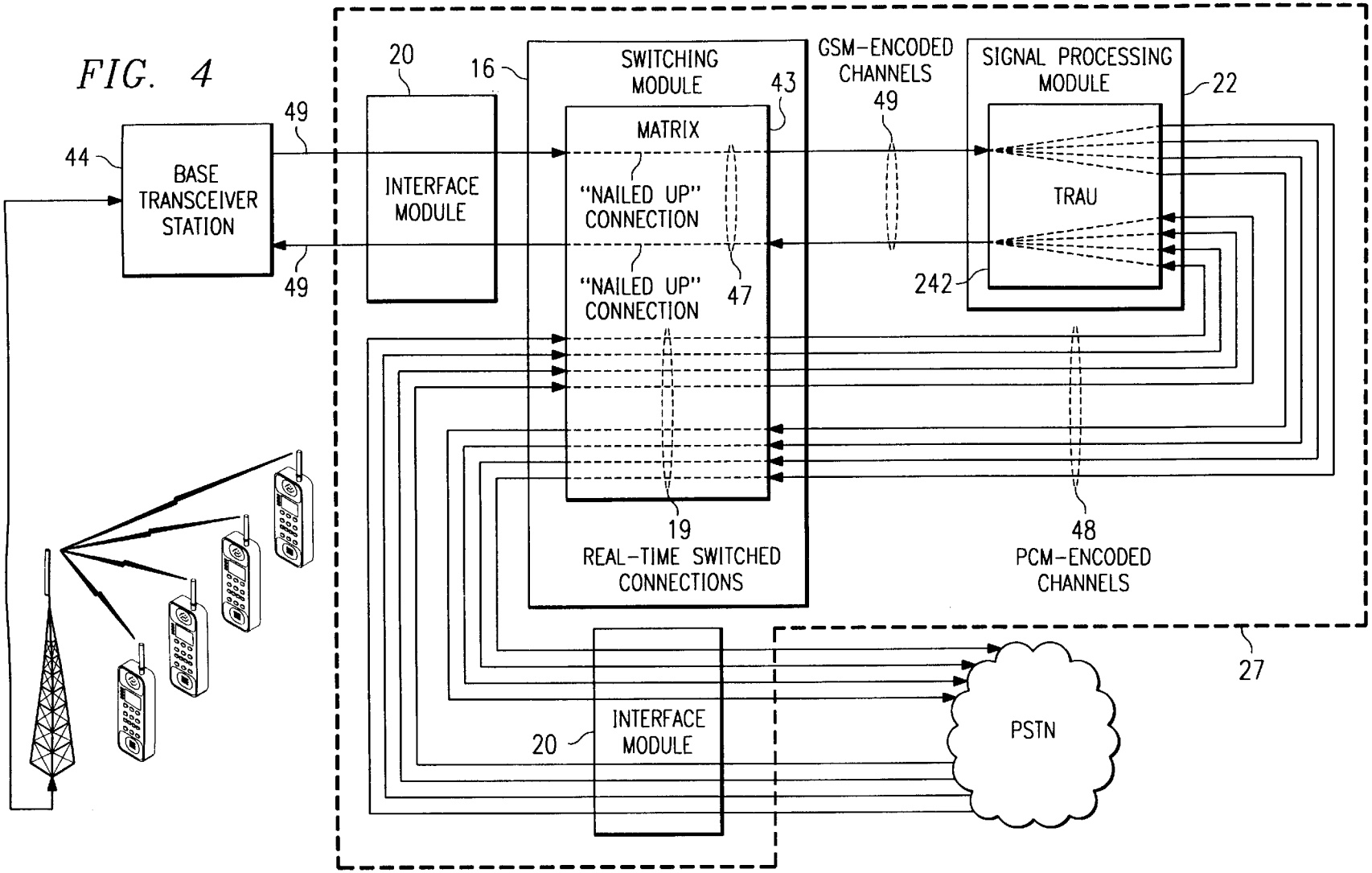
FIG. 4 is a system-level block diagram illustrating how connections may be formed through the telecommunications switching platform of FIG. 1.

FIG. 4 illustrates how connections may be formed through a telecommunications switching platform 10. In this embodiment, four GSM mobile phones are shown in wireless communication with a BTS 44. By the time the GSM-encoded voice signals are transmitted from the BTS 44 to the switch platform 10, they form a 64 kbps DSO information channel 49, which would preferably be transmitted within a telecommunications span 40 as discussed above. The span 40 is then received by the interface module 20 and is passed from there to the switching module 16. Because there is no reason to change the assignment of this GSM-encoded information channel 49 into the switching module 16, and because the GSM-encoded information channels 49 will preferably always have to be rate-adapted by the signal-processing module 22, it is advantageous to semi-permanently connect and assign the information channel to the signal-processing module 22. This semi-permanent connection is referred to as an "nailed-up" connection 47. In accordance with this designation, the addressing information required to maintain this connection through the switch 43 is stored in a table within the switching module 16. The addressing information is maintained there until the system is reconfigured or until an error occurs such as a component failure or a board is removed—which would require the connections to be reconfigured.

Still referring to FIG. 4, within the signal-processing module 22, a DSO channel comprising four 16 kbps GSM voice channels is expanded into four PCM-encoded information channels 48. This expansion is shown within the Transcoder Rate Adaptation Unit ("TRAU") functional block of the signal-processing module 22. These four PCM-encoded voice channels are then passed again back through the switching module 16. Since these various voice channels are switched in real time so that the GSM telephone users can make and receive phone calls to different individuals, the switching module 16 makes real-time switching assignments or connections 19 for these PCM-encoded voice channels 48. Thus, the switching module 16 dynamically updates the connection information describing how the circuits will be switched through the switch 43. In this example, the four PCM-encoded voice channels 48 are all passed through the same or a different interface module 20 and are then transmitted to the Public Switched Telephone Network (PSTN).

A GSM caller may also call another GSM mobile telephone. In that circumstance, one of the PCM-encoded voice channels 48 would be re-routed through the switch 43 to another channel of a signal-processing module 22 to be rate-adapted back to a 16 kbps GSM-encoded information channel 49 and then passed again through the switching module 16 and through the original or another interface module 20 to the same or another BTS 44.

FIG. 5 is a diagram showing the switching task that is accomplished by the switch 43 within the switching module 16. On the left-hand side of the figure, three exemplary bus inputs and outputs (high-speed buses 25) are shown. In the embodiments described above, there are twelve such high-speed buses 25 that pass through the switch 43. The switch is capable of receiving all of these buses and swapping a timeslot from any position on any input bus 25 to any position on any output bus 25. For example, in this figure the data from timeslot 1 of input bus 1 (B1_1) is placed in timeslot 2 of output bus 1, as indicated by the arrow drawn between these positions. Similarly, the data from timeslot 2 of bus 1 (B1_2) is placed in timeslot 0 of output bus 2 (B2_0), and so on. For illustration purposes, a number of other channel connections are illustrated in this figure. In the preferred embodiment, the switch 43 is capable of connecting in this manner any of 128 timeslots on any of the twelve input buses 25 to any of 128 timeslots on any of twelve output buses 25.

Figure 6:
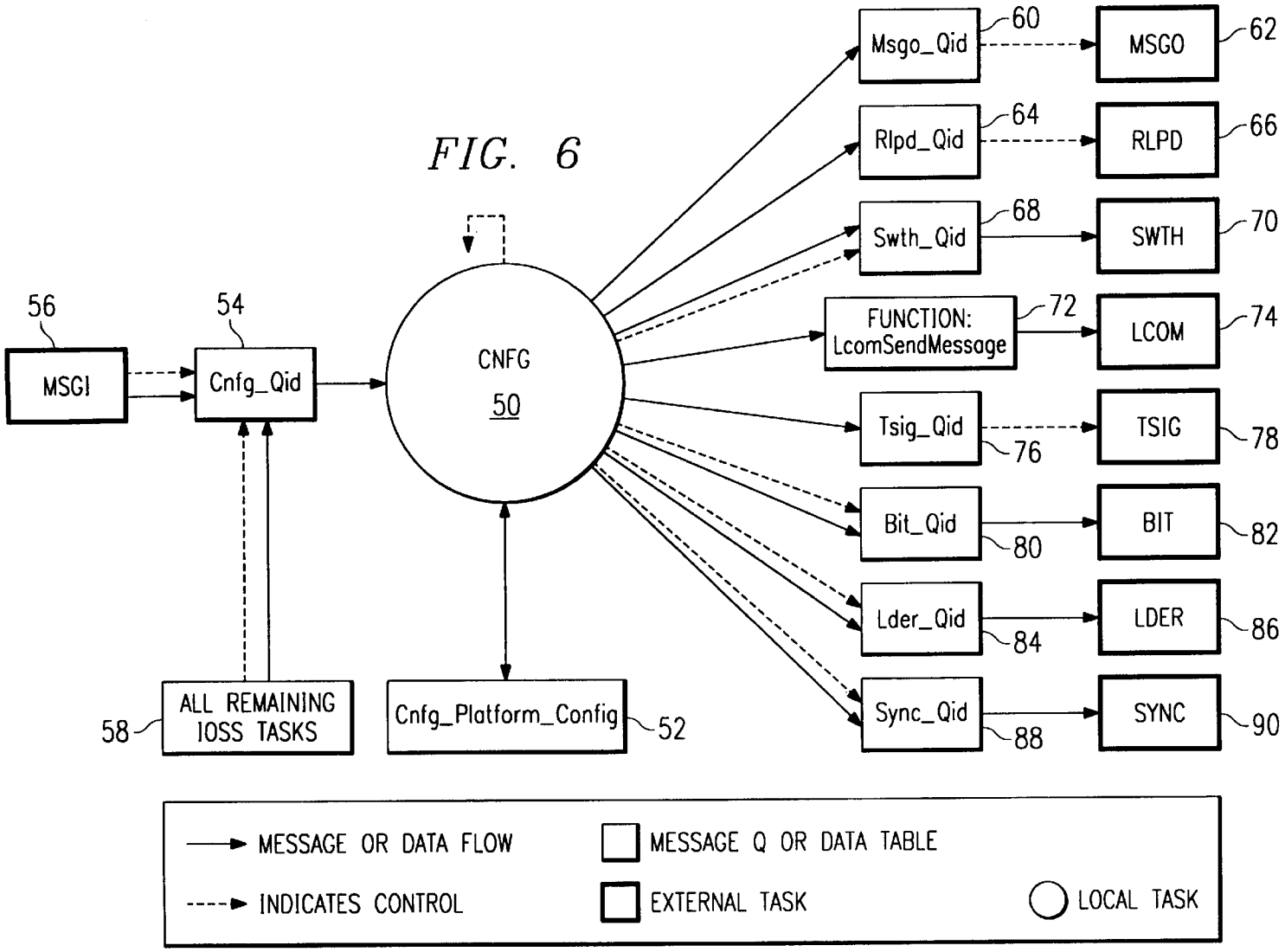
FIG. 6 is a task flow diagram illustrating the interfaces to a configuration task.

FIG. 6 is a task flow diagram illustrating interfaces to a configuration task ("CNFG") 50, which preferably executes in the switching module 16 and is responsible for all physical-configuration-related aspects within the platform (e.g., monitoring the number and type of boards, the backplane configuration, which connections have been "nailed-up," etc.). To maintain the platform database 52, which preferably includes a configuration table, messages containing configuration information are routed through CNFG 50. Upon receiving a message, CNFG 50 updates the database 52 as needed. If the message was destined for the switching module 16, CNFG 50 provides a response if needed. If the message was destined for one of the resource processors 18,20,22, CNFG 50 forwards the message to the appropriate resource processor 18,20,22.

According to an embodiment of the present invention, logical component identifiers (LCIs) are used as an addressing scheme to, for example, facilitate connections being made by the switching module 16. According to an embodiment of the present invention, an LCI is, for example, a 32-bit number that identifies the shelf, slot and board type by the upper 16 bits, the lower 16 bits of the LCI being context dependent as a function of the board type. LCIs can be made by any component needing to generate an LCI using, for example, a macro or function call that can take the underlying data, such as the shelf, slot, board type, etc. and put the data into the LCI 32 bit format. For example, LCIs can be generated by the call processor 12 for each of the spans 40 to identify to the switching module 16 the traffic channels and LAP_D channels that are to be added, as well as to make and break connections. Similarly, the switching module 16 can generate LCIs to establish nailed-up connections, the various LCIs generated representing, for example, the DSPs allocated to each nailed-up connection as well as the physical or logical circuits allocated to a traffic channel. In addition, the LCIs generated according to an embodiment of the present invention can be used as indices to the CNFG database 52 illustrated in detail in FIGS. 12A and 12B and discussed below.

The CNFG task 50 provides an interface to translate LCIs into high-speed bus 25 and timeslot 46 data for a SWTH task 70. The SWTH task establishes connections in the switch 43. These logical identifiers serve as indices to configuration database 52 that provides physical connection information to the CNFG task 50. CNFG task 50 passes the connection information to the switch 43 to make the appropriate connections between information channels on the high-speed buses 25. The CNFG task 50 will determine certain LCIs at system start-up.

An example of the building of a LCI is during system startup, at which time the switching module 16 receives description data from each installed resource processor 18,20,22, for example in the form of a registration message. When the registration information is received by the switching module 16, the CNFG task 50 utilizes the registration information (e.g., shelf, slot, board type) and builds a board LCI for each resource processor 18,20,22. The call processor 12 can also build LCIs. For example, the call processor 12 includes initial information on the components of the system (e.g., based on information manually provided by an operator during installation of the system), such as span configuration and the configuration of individual timeslots. Thus, the information known by the call processor 12 as well as registration information provided from the switching module 16 to the call processor 12 at startup of the switching module 16 can be used by the call processor 12 to build LCIs for spans 40 on each interface module 20. The CNFG task 50 in the switching module 16 or the call processor 12 can use, for example, macros to build and manipulate each LCI. For example, MAKE macros can be used to put the data into the proper fields of the LCI while the GET macros allow retrieval of the particular fields of interest in the LCI.

According to an embodiment of the present invention, LCIs are 32 bits although all of the bits may not be used for each LCI. For example, when addressing IOSS Platform boards 27, the LCI is constructed using the shelf, slot, and interface fields. Any remaining fields will be set to NONE. All boards within the IOSS Platform 27 (e.g., resource processors 18,20,22) are addressable in this manner. The below table demonstrates Board LCI 0x0054FFFF, residing at slot 5 on shelf 0 and is a board type 4, which is an arbitrarily selected designation for an interface module 20 according to an embodiment of the present invention.

| Shelf | Slot | Board Type | Span Type | Span | Logical circuit |
|---|---|---|---|---|---|
| 4 bits<br>0x0 | 8 bits<br>0x5 | 4 bits<br>0x4 | 4 bits<br>0xF | 4 bits<br>0xF | 8 bits<br>0xFF |

Preferably, the upper or most significant 16 bits of the above exemplary 32-bit logical identifiers or LCIs consistently provide the same types of information, i.e., shelf, slot, and board type. The lower 16 bits are preferably context-sensitive, depending upon the type of resource or communication channel that is being identified.

To make the LCI, the shelf, slot, and board_type data is preferably provided to a MAKE_BOARD_LCI macro, which would then generate the properly-formatted LCI. For example, to create a LCI for a span 40 on an interface module 20, a trunk LCI would be used to address individual circuits (e.g., DSOS) on an interface module 20. When the specified span being addressed is configured as a land span (e.g., a PSTN span), the physical circuits are used to construct the LCI, as each timeslot (DSO) on the span carries a PSTN traffic channel. However, if the specified span is configured as an air span (e.g., a GSM span), then logical circuits are used to do the mapping to the air traffic channel, as each physical timeslot (e.g., a 64kbps DSO) carries four air traffic channels (e.g., 4 16 kbps GSM traffic channels). Thus, a single span carries 32 physical timeslots addressed by a physical circuit, each physical timeslot supporting four air traffic channels resulting in 128 air traffic channels that can be addressed via a logical circuit. When nailing up a connection for an air span, however, logical circuits cannot be used because a single DSP supports one physical circuit and four logical circuits. Thus, the nailed-up connection for four air channels uses the same DSP and thus the nailed-up connection for the four air traffic channels must use the physical timeslot of the DSP. Thus, according to an embodiment of the present invention, an air span LCI can contain a force physical bit that when set causes the appropriate physical circuit to be used for the nailed-up connection, the force physical bit then being not set so that the logical circuits are used for call processing. Therefore, when specifying a trunk connection to the platform 27, LCIs for trunks may, for example, be constructed as follows:

| Shelf | Slot | Board Type | Span Type | Span | Logical circuit |
|---|---|---|---|---|---|
| 4 bits<br>0x0 | 8 bits<br>0x5 | 4 bits<br>0x4 | 4 bits<br>0x0 | 4 bits<br>0x0 | 8 bits<br>0x07 |

The above example is for a land circuit (also known as a PSTN trunk) having an LCI of 0x00540007. The first five fields are preferably fixed for all the field in a particular span. The last field, "logical circuit," maps differently based on the interface and circuit type. In this example, the interface is an E1 standard landspan, indicated by "0×0" in the span type field, and is assigned to timeslot 7 on the span(because of the "0×7" in the logical circuit field). An air span would have been a different span type and the logical circuit field would contain a number between 0 and 127 (decimal). For any DSO that has been allocated for a LAP-D channel, a group of four logical circuit numbers will be allocated, but only the first will be used to access the LAP-D signaling channel.

When addressing spans 40, the LCI is constructed using all of the fields, except for the logical circuit field. The logical circuit field is preferably set in this circumstance to 0xFF. Spans 40 are preferably addressable via the interface modules 20. Both the Span LCIs and the Channel LCIs (e.g., the last field of an LCI) refer to an interface module 20. Accordingly, the range of permissible values for "Slot" would be the same for either a Span LCI or a Channel LCI—specifically, the permissible range would be those slots where an interface module 20 could be placed on the shelf. Further the Board Type would be the same for either, specifically "4" in this exemplary embodiment, referring to an interface module 20. The Span Type and Spanfor Channel LCIs and Span LCIs would also have the same range of values, as when identifying a particular Channel LCI, one must first identify the span 40 on which that channel is being carried. The Channel LCI contains the additional, final field that identifies the time slot 46 of the information channel within a particular span 40. For land-based spans having 64 kbps PCM information channels, there will be 32 timeslots (or Channel LCIs) per Span LCI. Since GSM-based voice channels are encoded at 16 kbps, when the span 40 carries nothing but GSM-encoded voice channels there will be 128 timeslots or Channel LCIs per Span LCI (4 channels within each 64 kbps timeslot).

DSP LCIs are used when accessing signal processing module 22 or telephone support module 18 resources. DSP LCIs can be used to identify individual DSPs. The LCI below illustrates a DSP LCI.

| Shelf | Slot | Board Type | unused | DSP | Channel |
|---|---|---|---|---|---|
| 4 bits<br>0x0 | 8 bits<br>0x0 | 4 bits<br>0x2 or 0x3<br>(PSM or SPM) | 4 bits<br>0xF | 4 bits<br>0x0 | 8 bits<br>0xFF |

For a DSP LCI on a signal-processing module 22, the DSP field ranges from 0–8 (i.e., there are up to eight DSPs on a preferred embodiment signal-processing module 22) and individual DSPs are addressed 1–8 with 0 indicating a broadcast message. For a DSP LCI on a telephony-support module 18, the DSP field ranges from 0–6 (i.e., there are six DSPs on a preferred-embodiment telephony-support module 18), and individual DSPs are addressed 1–6 with 0 indicating a broadcast message. While a DSP LCI for a signal-processing module 22 identifies an individual DSP, the Channel field identifies one of the decoded DSP connections 49 or one of the four decoded DSP connections 49. For a telephony-support module 18, the channel field represents the resource provided by the module 18, for example a tone generated by the module 18.

According to an exemplary embodiment of the present invention, when forming connections, the application layer, which is comprised of the call processor 12, for example via a resource manager within the call processor 12, provides the LCIs for the two endpoint information channels that the call processor 12 wishes to connect. The IOSS platform 27 forms all intermediate connections through the switch 43, including any connections that may be required through the signal processing modules 22 in a manner that is transparent to the call processor 12 and the resource manager.

This method and system for providing logical identifiers for components and communications channels provides a way to identify, preferably throughout the entire platform, all elements and channels to be connected and to make connections between those elements. A standard format is provided that builds up a LCI in a building block manner that can also be used as indices to a database of configuration information to allow dynamic updating of the database and remapping of connections without involving the call processor. In addition, the LCIs according to an embodiment of the present invention can be built as needed by various components thereby reducing the burden on the call processor to track an entire set of connections and allowing alternate connection paths to be established without invoking call processor logic. This provides significant flexibility over prior-art systems in which incoming lines, outgoing lines, and platform resources are identified in a single list or database that is generally accessed by a single process that is responsible for managing the formation of these connections.

The CNFG task 50 provides a function to translate LCIs into the high-speed bus 25 and timeslot 46 information. This function preferably translates one or two LCI values with one operation. In an embodiment of the present invention, there are, for example, three parameters to this function: count; lci_xlate_ptr; and phys_xlate_ptr. The count parameter will specify the number of LCI values to translate. The preferred range is 1 or 2. The lci_xlate_ptr points to a 32-bit array maintained by the function requesting the translation containing the LCI values to translate. The phys_xlate_ptr points to an array of structures that will contain the translated line and slot data for each of the input LCI values, which is also established by the function requesting the translation. This function returns a zero value, unless an error is encountered. LCIs that identify individual communications paths (timeslots on spans) will be translated to physical circuits within the IOSS Platform 27. Additionally, the CNFG task 50 (see FIG. 6) maintains the look-up tables needed to translate LCIs (see FIGS. 12A–12B).

Also, CNFG task 50 provides interfaces to report alarms and software errors. Alarms caused by the switching module 16 are considered local alarms, while alarms generated by resource processors 18,20,22 are considered remote alarms. In any case, both types of alarms are passed to the CNFG task 50 for processing. Operationally, this task 50 maintains and controls physical platform configuration information, hardware fail-overs, and processes "hot-removal" and "hot-insertion" of resource processor or other boards. The CNFG task 50 also manages the state of the switching module 16 and monitors the status of the resource processors 18,20,22 within the switching platform 10. CNFG 50 maintains a table of state information for each resource processor 18,20, 22 and for the redundant switching modules 16.

As shown in FIG. 6, the CNFG task 50 interfaces with the resource manager software modules running on the call processors 12 and many of the other tasks executing within the IOSS platform 27. These interfaces may be implemented, for example, by the use of message queues. CNFG 50 interfaces with each task's command mailbox. The CNFG 50 task accepts commands through its message queue, Cnfg_Qid 54. In an embodiment of the present invention, the messages arriving in the queue 54 via MSGI task 56 originated in the Resource Manager.

After processing startup initialization functions, this CNFG task 50 is driven by, for example, an event flag. The event flag indicates that a message has been placed in CNFG's message queue, Cnfg_Qid 54. Preferably, all configuration-related messages pass through CNFG 50. The CNFG task 50 may be commanded by the Resource Manager to issue state-change commands (e.g., ONLINE, OFFLINE) to boards residing within the IOSS platform 27. Also, board additions and removals are preferably detected and reported to this task. Finally, in addition to maintaining platform configuration, this task effects redundant fail-overs when necessary.

All objects required by the CNFG task 50 are preferably available at startup. The CNFG task 50 starts by initializing itself and resetting all configuration tables. During startup, the task reads a system information and status register on the switching module 16. This system information is preferably accessed through a memory-mapped input/output of the switching module controller 156, which is connected to hardware on backplane of the IOSS platform 27 and to hardware on the switching module 16 itself. System information included here would preferably include the slot_id of the switching module and a version identification number for the switching module 16.

The results of this read of the status register are then made available to the other tasks within the IOSS platform 27. This information is also preferably made available in a global data structure. Information that may be included in this global data structure include, for example, the following fields:

write_protect: Indicates whether the bootstrap portion of the IOSS platform 27 is write protected shelf address: Indicates on which shelf of a telecommunications rack the IOSS platform resides slot_id: Indicates in which slot of a telecommunications rack shelf a module has been placed hardware info: may be used to provide model and revision information for the rack backplane and/or module PCB On startup, code within the switching module verifies the above fields, and generates an error if information contained in these fields is incorrect or not within the range of possible values. To enable the switching module 16 to initialize itself, it preferably contains a boot-only version of its operation code which is stored in, for example, a write-protected portion of the switching-module's nonvolatile memory 160 (not shown, see FIG. 8). This boot-only code would contain, for example, a minimal system to allow loading of run-time code into the switching module 16. It would be burned into the boot-block of the nonvolatile memory 160, preferably during the manufacturing process. The boot-only code comprises the following IOSS tasks:

| | |
|---|---|
| ROOT | Root task |
| MSGI 56 | Message router in |
| MSGO 62 | Message router out |
| LDER 86 | Code loader |
| CNFG 50 | Configuration |

The tasks mentioned are preferably logically identical to their operational counterparts; the only difference being their data tables. The boot-only executable version contains minimal functionality, while the operational version contains full system functionality. The Boot-only version of Root starts MSGI 56, MSGO 62, CNFG 50, and LDER 86 and then also allows at least some communications to the Resource Manager.

The operational version of the code contains the functionality included in the boot-only version plus, for example, switching functionality and built -in test and fault isolation test (BIT/FIT) capability. Additional IOSS software includes the following tasks:

| | |
|---|---|
| BIT 82 | Built In Test |
| CNFG 50 | Configuration |
| LCOM 74 | Local Communications |
| RLPD 66 | Remote LAP-D |
| SWTH 70 | Switch |
| TSIG 78 | Trunk Signaling/PCM Message support |
| SYNC 90 | Redundancy control |

The run-time version of the root task first creates the objects required by the run-time tasks using table driven functions. Root provides global object ID's that each task may use to access the objects. Then, Root will create and start all of the tasks described below. Upon completion, Root will suspend itself.

The Message Router In 56/ Message Router Out 62 (MSGI/MSGO) tasks is one point of communication between the IOSS platform 27 and the Resource Manager, and is preferably implemented through a pNA socket interface. MSGI 56 reads from a socket and routes the messages to the proper destination within the IOSS platform 27. Messages may be delivered locally to other tasks executing on the switching module 16, over a remote LAP-D link to the BTS 44, or over the LCOM link 24 to various resource processors 18,20,22. MSGI 56 blocks on socket reads if data is not available. MSGO 62 preferably uses one input message queue, blocks on a read from the queue, and delivers the messages to the proper destination.

The Loader (LDER) task 86 performs downloads to nonvolatile memory 160 and is the file handler for downloads to the resource processors 18,20,22. Download messages are received from Resource Manager (RM) via the MSGI task 56. The download messages may indicate boot block loads, executable loads, or loads to Field Programmable Gate Arrays (FPGAs) in the resource processors 18,20,22 or switching module 16. For each of the three downloadable entities managed by LDER 56, there is a known file name that LDER 56 will use. These files preferably reside on a disk that is capable of being NFS-mounted and accessed directly by LDER 56. The results of the download will be sent up to the Resource Manager through MSGO 62.

The Built-In Test (BIT) task 82 will, under normal operation, periodically execute a list of built-in diagnostic tests. The BIT task 82 is described generally below, and in detail in U.S. patent application No. 09/026,467, entitled "Fault Testing in a Telecommunications Switching Platform," (Docket No. 24194000.185), filed on Feb. 19, 1998, which is hereby incorporated by reference herein.

The Configuration task (CNFG) 50 is preferably responsible for all board-configuration-related aspects within the IOSS platform 27. In one embodiment, this task 50 generates a configuration table, specifically including at least logical identifier or LCI translation tables for use by SWTH 70. CNFG 50 "nails-up" connections 47 (see FIG. 4) within the IOSS platform 27 on command from the Resource Manager. Once this has been performed, CNFG 50 monitors resource processor 18,20,22 statuses and informs the Resource Manager when the IOSS platform 27 is ready to begin operation. Operationally, this task maintains platform configuration information, manages hardware failovers, and processes "hot-removal" and "hot-insertion" of boards. Also, CNFG 50 is preferably responsible for requesting table downloads within the switching module 16.

To maintain the platform configuration information, CNFG task 50 handles resource processor 18,20,22 board insertions and extractions. The removal of any resource processor 18,20,22 is preferably detected at run-time by LCOM 74 and reported to CNFG 50. The Resource Manager detects the removal of a switching module 16 at run-time. CNFG 50 reports the board removal (except for switching module 16 removal) to the Resource Manager and adjusts the database 52 to reflect the new hardware status. Additionally, CNFG 50 generates disconnect commands for SWTH 70 if the board removed was currently in use.

If a switching module 16 is hot-inserted into the IOSS platform 16, it will automatically become the off-line switching module 16. The SYNC task 90 ensures that the newly-inserted switching module 16 is synchronized as quickly as possible with the existing switching module 16 in case a failover is necessary. If a switching module 16 is hot-inserted into a system, it automatically becomes an off-line slave.

Any signal processing modules 22 added to the IOSS platform 27 at run-time are also detected by LCOM 74 and reported to CNFG 50. CNFG 50 reports the board addition to the Resource Manager and adjusts the configuration database 52 to reflect the new hardware status. SWTH 70 does not need to be told about signal-processing module 22 additions. Adding a signal-processing module 22 will increase the pool of DSPs 240 (see FIG. 11) available to the IOSS platform 27.

With continued reference to FIG. 6, any interface modules 20 added to the IOSS platform 27 at run-time are detected by LCOM 74 and reported to CNFG 50. In this embodiment, CNFG 50 reports the board addition to the Resource Manager and then adjusts the database 52 to reflect the addition. CNFG 50 preferably will not by itself place the new spans 40 into service. If spans 40 are connected, TSIG 78 receives a message indicating that the span 40 is active. The Resource Manager then requests that the specified span 40 be brought into service.

The Local Communications (LCOM) task 74 establishes and maintains a point-to-multipoint connection and connectivity to the resource processors 18,20,22 within the IOSS platform. In one embodiment, each resource processor 18,20,22 within the IOSS platform uses its slot id as its identifier. LCOM 74 identifies resource processors 18,20,22 that are currently active in the IOSS platform 27 and periodically polls unused slots to determine if a board has entered the system. LCOM 74 recognizes and reports when resource processors 18,20,22 are no longer communicating or when one of the links has failed.

Still referring to FIG. 6, the Remote LAP-D (RLPD) task 66 provides communications to the BTS 44. RLPD is accessed via special messages from Resource Manager to establish connections, pass messages to the BTS 44 and release connections.

The Switch (SWTH) 70 task services the Resource Manager. SWTH 70 receives messages from the Resource Manager, via MSGI 56. Based on the received message, SWTH 70 makes the necessary connections through the switch 43. The results of commanded actions will be sent to the Resource Manager through MSGO 60. Another function of SWTH 70 is to service BIT 82 requests to establish connections to perform testing. SWTH 70 maintains a table indicating current timeslot connections and status (operational, BIT, unused, etc.).

Preferably, all of the connections in the interface modules 20, signal-processing modules 22, and telephony-support modules 18 will be "nailed-up" connections 47, so that real-time switching occurs primarily in the switching module 16. The resource processors 18,20,22 can be initialized to their "nailed-up" connections 47, but will also respond to run-time commands requesting connections or disconnections.

Figure 7:
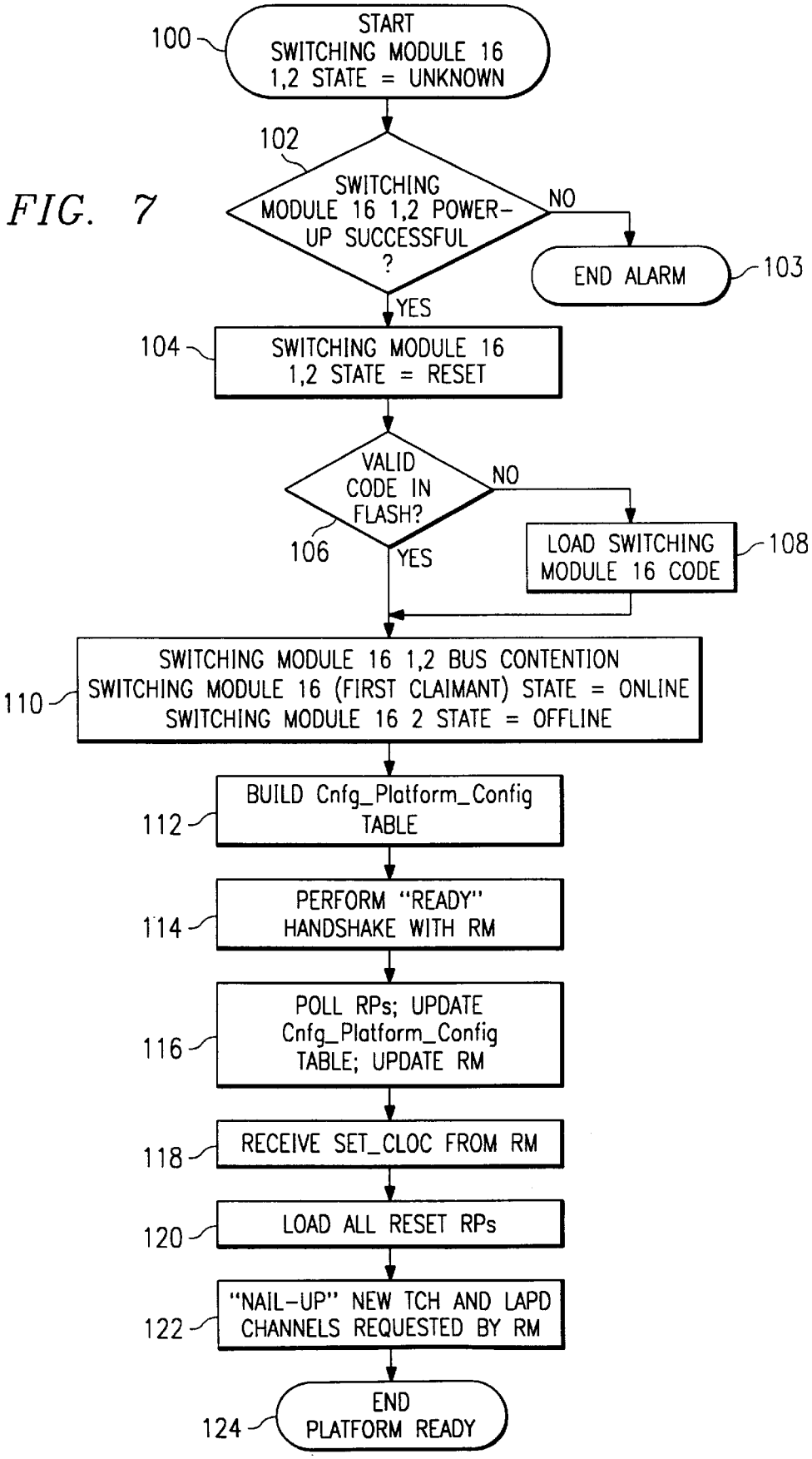
FIG. 7 is a flow diagram of the steps taken by the switching module upon startup of the telecommunications switching platform.

FIG. 7 is a flow diagram of the steps taken by the CNFG task 50 upon startup of the IOSS platform 27. In this embodiment, there are redundant switching modules 16. At step 100, the states of these switching modules 16 are unknown. Since in the preferred embodiment, the switch modules 16 have nonvolatile memory, which is used to store the switch module executable code, upon start-up it is not known whether the switching modules 16 have executable code stored in their memory or not. The CNFG task 50 running on each of the redundant a switch modules 16 perform an initialization which includes executing a power-up self-test suite. Upon successful completion of self-test, the switching module 16 firmware determines if run-time executable code is present in nonvolatile memory 160 (see FIG. 8). If a run-time version is present, it is preferably copied from nonvolatile memory 160 to memory (preferably DRAM or SRAM) 158 and control is passed to the memory 158 (preferably RAM) version. The loaded run-time software preferably starts the operating system and the IOSS tasks. Each switching module 16 will assert its bus_ready line and try to become the master. Once the executable is running from memory 158, the nonvolatile memory 160 can be reprogrammed.

To allow for more efficient system power-up, the switching modules 16 of the present invention preferably have their operating systems stored in the nonvolatile memory 160, which can be reprogrammed without removing it from the system. For instance, the nonvolatile memory 160 might be a Flash memory, or an Electrically Erasable Programmable Read-Only Memory (EEPROM) or it might be a battery-backed Static Random Access Memory (SRAM), or it might another type of nonvolatile, reprogrammable memory. By keeping the operating system in a nonvolatile memory 160 associated with the switching module 16, the preferred embodiment platform 10 eliminates the need for a time-consuming download of operating system code into a large number of volatile memories associated with the switching modules 16 and resource processors in the platform 10. Instead, each controller 50 powers-up ready-to-operate with its own operating code. Then, if necessary, perhaps while the platform is already up and operating, new operating system code can be downloaded and programmed into the nonvolatile memories 160 of the switching modules 16 without interruption to the system or delay in the system power-up.

The download of the operating code from the high-level elements in the system preferably comprises the access of a hard disk drive connected to the call processors 12. Within the hard drive is stored a number of files containing the operating code for various processors on the switching modules 16 and resource processors 18,20,22 in the telecommunication switching platform 10. For example, a number of files might be assigned as follows according to the particular module in the switching platform and the resources operating on the modules:

| | Module Names | | | |
|---|---|---|---|---|
| Process | SDM | PSM | SPM | QSM |
| Boot Code | X | X | X | X |
| Operating Code | X | X | X | X |
| R2 Signaling Code | | X | | X |
| FPGA Code | X | X | X | X |
| Voice Message Code | | X | | |
| DSP Code | | X | X | |

Thus, for each cell in the above table that is marked with an "X", the call processor 12 and its associated hard drive (or other storage device) preferably will maintain a file containing operating code for the indicated process. If a resource processor wakes up already having valid operating code stored in it, the resource processor will begin operating from that code. If, on the other hand, a resource processor does not contain valid operating code on start-up, it will have to wait until at least some of these files are downloaded to it before it can begin operating. Also, when file updates are made to these operating code files, the Resource Manager level of the call processor can request that these file updates be made to the various resource processors 18,20,22 and switching modules 16.

The download of each of the files will preferably have a particular format that will identify the type of file that is being downloaded. Particularly, the file will have a file signature that identifies the generation of switching platform on which the file is to reside, the particular module, and the type of code within the particular module. The format of the file will preferably be as follows:

| FILE HEADER - 32 BYTES | | | | FILE | END-OF-FILE & CRC |
|---|---|---|---|---|---|
| JUMP | FILE SIGNATURE | VER-SION | LENGTH | FILE | EOF + CRC |

In the above file format, the first two bytes are preferably a JUMP code, which are preferably used only for the controller in the resource processor. Files not intended for the controller might include a false jump code such as, for example, "00." The "EOF" code is optional and preferably not needed in the file format, since there is a "LENGTH" field.

After this initialization, the switching module 16 builds up empty configuration tables in step 112 based on its read of the system information and status register (e.g., stored in a hardware register of the switching 16), and described further with regard to FIGS. 12A and 12B. If the CNFG task 50 executes successfully, it sends a "Ready" message to the Resource Manager indicating that the switching module 16 has had a successful power-up 102. At that point, the switching module 16 is in a state called a "Reset" 104. Next, the CNFG task 50 determines whether there is valid executable code in the nonvolatile memory 160 of the switching module 16 (step 106). If the CNFG task 50 determines that there is no valid executable code in the nonvolatile memory, it calls to the LDR 86 (see FIG. 6). At step 108, then, LDR 86 loads executable code into memory 158 from an external data base, for example, or from a transmission from a higher-level application within the telecommunications switching platform 10.

If the power-up self-test suite fails for any reason, the failure may be reported by at least two methods. First, a message can be written to an RS-232 maintenance port on the switching module (which may or may not have a terminal connected), then an error code may be flashed on the switching module 16 front panel. Dependent upon what point in the power-up test sequence a failure is detected, the operating system may or may not be started. If the operating system is active, then an error message will also be sent to Resource Manager. Also, at this point, the switching module 16 will not have asserted the bus_ready line and will therefore not attempt to become a master. If a run-time executable is not present in nonvolatile memory 160, the boot version will be copied from nonvolatile memory 160 to memory 158 and restarted. Now that the operating system is running, the Root task will be started and will eventually request a download from Resource Manager. A switching module 16 that does not contain a run-time executable will not assert the bus_ready signal, and will not attempt to become a master. It will instead preferably flash a fatal error code.

Still referring to FIG. 7, once the executable code has successfully been loaded into each of the redundant switching modules 16, the platform determines which of the switching modules 16 will be ONLINE and which of the switching modules 16 will be OFFLINE. This is resolved in step 110, where each of the switching modules 16 attempts to seize control as master of the control bus 24. Once bus ownership has been resolved at step 110, the CNFG task 50 builds the configuration table 52 at step 112. The configuration table 52 is initially constructed in step 112 as an empty table whose size and fields are determined by what the CNFG task 50 has read from the information and status register of the switching module 16. Once the empty configuration table 52 has been constructed in step 112, at step 114 each switching module 16 sends a "Ready" message to the Resource Manager. Each switching module 16 at this time also reports its state, i.e., one of the switching modules 16 is ONLINE while the other switching module 16 is OFFLINE. The switching module 16 that is ONLINE then begins at step 116 to receive configuration information from each resource processor 18,20,22 that is in communication with the switching module 16. Also at step 116, the switching module 16 continues after updating the configuration table 52 and provides the Resource Manager with this configuration information so that the Resource Manager can keep its system configuration database current. FIGS. 12A and 12B further illustrate the building of database 52.

The CNFG task 50 continues at step 118 in which the switching modules 16 receive a SET_CLOCK message from the Resource Manager. Both the ONLINE and the OFFLINE switching module 16 receive the SET_CLOCK message, so both of the switching modules 16 can be synchronized with the Resource Manager. For those resource processors 18,20,22 that are in the reset state, executable code is preferably loaded therein. In step 120, the Resource Manager issues LOAD messages for each resource processor 18,20,22 that is in the RESET state. The LDER task 86 (see FIG. 6) within the switching module 16 is responsible for processing these downloads to the resource processors 18,20,22.

With further reference to FIG. 7, the call processors 12 along with the switching modules 16 begin the task of assigning resources to traffic channels 48, 49, and control and signaling (LAPD protocol in this embodiment) channels 48. This occurs at step 122, where the Resource Manager generates and sends ADD_TCH and ADD_LAPD messages to the CNFG task 50. At step 122, for each "add" message, the CNFG task 50 will establish "nailed-up" connections 47 through the necessary interface modules 20 and signal-processing modules 22 and will send appropriate connection commands to the SWTH task 70. Still at step 122, for all ADD_TCH messages, CNFG 50 will attempt to locate and assign (by issuing the nailed-up connection request to the SWTH task 70, see FIG. 6) signal-processing module 22 resources. For all ADD_LAPD messages, "CNFG 50 will locate and assign (by issuing a nailed-up connection request to the SWTH task 70, see FIG. 6) LAPD controller resources within the switching module 16. Once these steps have been completed, the CNFG task is at step 124, and the IOSS platform 27 is ready to place calls.

Figure 9:
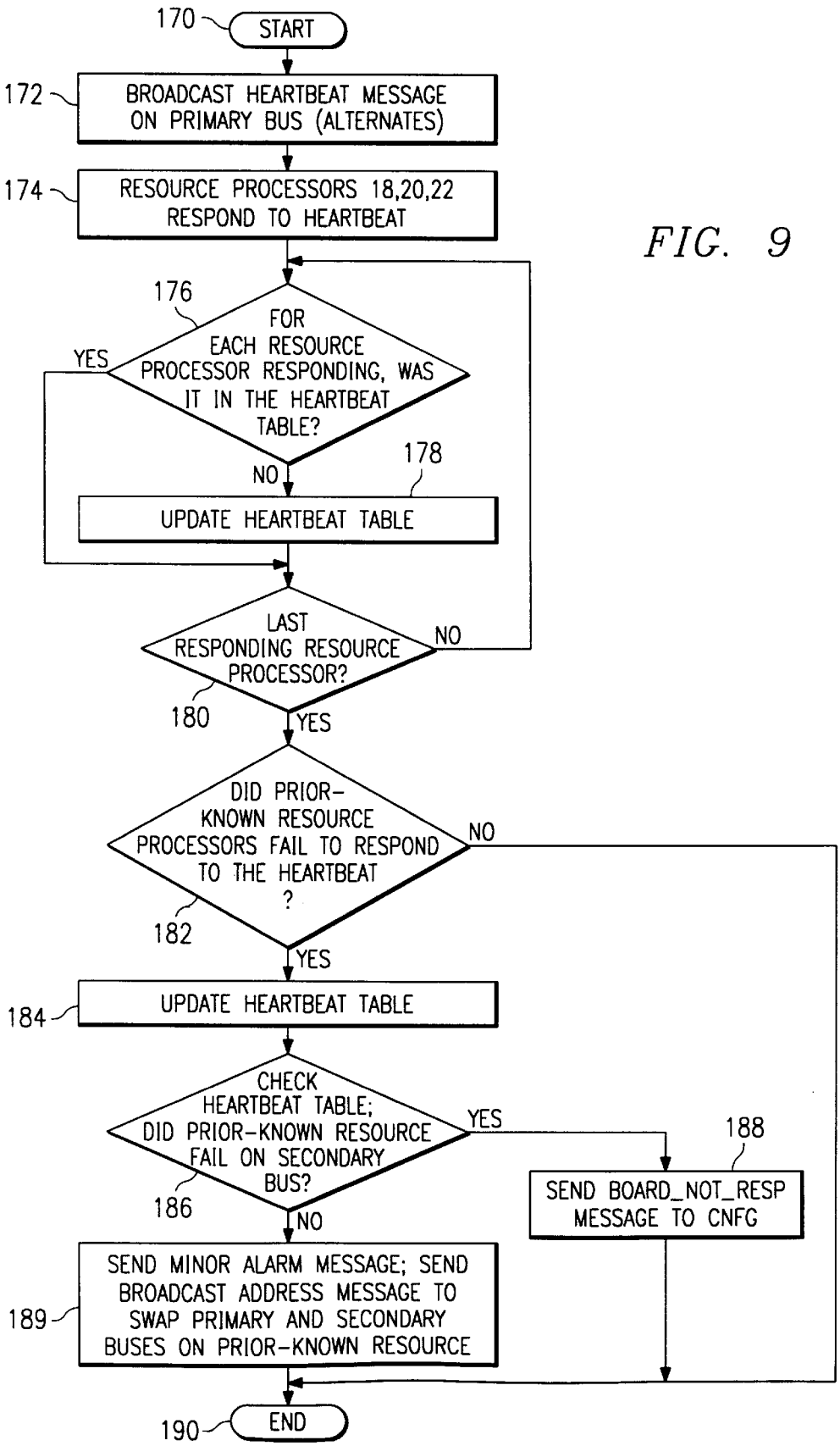
FIG. 9 is a flow diagram of Primary Heartbeat Messaging function.

Referring now to FIG. 9, the LCOM application software for the resource processors 18,20,22 consists of two message functions, which handle all LCOM heartbeat messages: Primary Heartbeat Messaging and Secondary Heartbeat Messaging.

Primary Heartbeat Messaging. Primary heartbeat messaging is the ONLINE switching module's 16 mechanism for detecting and responding to hot insertions, hot removals, and primary LCOM bus 24 failures. "Hot" insertions and removals refer to insertions and removals that are performed when the switching platform 10 is powered-on and operating. A Heartbeat Table is provided on the switching module to monitor the status of the various resources in the telecommunications switching platform. The Heartbeat Table is kept at a lower applications level in the system than is the Configuration Table, and these tables are preferably separate. Other embodiments are, however, possible in the present invention; specifically, the status information could be maintained in real-time in the configuration table, and the below-mentioned updates to the Heartbeat Table could be made instead to the Configuration Table.

Periodically, at step 172, the switching module 16 broadcasts a heartbeat message on both control buses 24. Each resource processor 18,20,22 responds at step 174 to the broadcast message received on its primary bus 24. For each resource processor 18,20,22 that responds, the Heartbeat Table is checked at step 176 to determine if the resource processor 18,20,22 was previously registered therein. This is done for each responding RP, as can be seen by decision block 180. If a newly inserted resource processor 18,20,22 responds to the broadcast message, the switching module 16 registers this slot as a hot insertion at step 178. If an existing resource processor 18,20,22 fails to respond, at step 162, in the next heartbeat cycle the switching module 16 board tries transmitting a Heartbeat Message over the secondary bus 24. If the resource processor still fails to respond over the secondary bus 24, according to the test at step 186, then the switching module 16 registers either a hot removal or a board failure for that resource processor 18,20,22 at step 188. The switching module 16 makes this registration by removing the resource processor 18,20,22 from the Heartbeat Table and updating the Cnfg-Platform Cnfg table 52 (see FIG. 6).

Still referring to FIG. 9, more detailed embodiments will be discussed below. In one embodiment, at step 172, the LCMH task clears the response number and response bus fields of the Heartbeat Table and broadcasts the heartbeat message on both buses 24 in an alternating fashion. In other words, the LCMH will transmit a heartbeat message first over one of the buses (Bus A) and then will transmit a heartbeat message on the other bus (Bus B). Bus A may be a primary bus for some resource processors 18,20,22 and may be a secondary bus for the others. Bus B may be a primary bus for those buses for which Bus A was the secondary bus and may be a secondary bus for the others. The LCMH task sends the broadcast heartbeat message, which is preferably of the following format:

| PROCESSOR ID | PROCESS ID | LENGTH | BUS_ID |
|---|---|---|---|
| UINT1<br>Either<br>BROADCAST_ADDR_A<br>or<br>BROATCAST_ADDR_B | UINT1<br>PID_LCOM_<br>HEARTBEAT | UINT2<br>0x0001 | UINT1<br>ESCC2_BUSA<br>Or<br>ESCC2_BUSB |

BROADCAST_ADDR_A is used for broadcasting to those resource processors 18,20,22 that have Bus A as their primary bus 24. BROADCAST_ADDR_B is used for broadcasting to those resource processors 18,20,22 that have bus B as their primary bus 24. The Bus_Id corresponds to the primary bus 24 of the resource processor 18,20,22.

Each resource processor 18,20,22 is preferably configured to receive a broadcast heartbeat message on its primary bus 24, so each resource processor 18,20,22 receives and responds at step 174 to only one of the broadcasted heartbeats. Upon reception, a message distributor within the resource processor 18,20,22 sends it to the PidCmnLcomHeartbeat message function. This message function performs actions depending on the resource processor 18,20,22 state and then responds at step 174 to the switching module 16 by sending a heartbeat response message on its primary bus 24. An exemplary format for the heartbeat response message is defined below:

| PROCESSOR ID | PROCESS ID | LENGTH | LCOM MESSAGE TYPE | SLOT ID | BUS_ID |
|---|---|---|---|---|---|
| UINT1<br>BID_SDM | UINT1<br>LCMH_ID | UINT2<br>0x0003 | UINT1<br>0x01 | UINT1<br>Slot ID of the resource processor 18,20,22 | UINT1<br>ESCC2_BUSA<br>or<br>ESCC2_BUSB |

The LCMH_ID is the process_id of the LCMH_ID task. The Bus_Id represents the primary bus 24 of the resource processor 18,20,22.

When the switching module 16 receives a heartbeat response message from a resource processor 18,20,22, it is distributed to the LCMH task, which at step 178 updates the Heartbeat Table for that particular resource processor 18,20,22. The Heartbeat Table is updated to indicate the new valid response count and the new bus 24 on which the response was received.

After one second has elapsed since the broadcast, the LCMH task updates the Heartbeat Table state fields based on the responses collected in the response number and response bus fields of the Heartbeat Table. The LCMH task then performs actions based on the state of each resource processor 18,20,22 in the Heartbeat Table.

The following sections describe how the heartbeat mechanism detects hot insertions, hot removals, and primary LCOM bus 24 failures.

Hot Insertions. The following method for detecting hot insertions accounts for the switching module 16 or the resource processor 18,20,22 powering up first, and allows for new resource processors 18,20,22 to attempt connection on both buses 24 in case the board has only one good bus 24. Also, this method eliminates the need for CNFG task to ping all slots at startup. The CNFG task is described in greater detail in U.S. patent application No. 09/026,486 (Docket No. 24194000.196), entitled "System and Method for Forming Circuit Connections within a Telecommunications Switching Platform," which was filed on Feb. 19, 1998 and is hereby incorporated by reference herein.

When a resource processor 18,20,22 has finished booting and initializing, it goes into registration mode. In an attempt to balance the message load, the board initially sets its broadcast address and primary bus 24 based on its slot number. In one embodiment, if a resource processor 18,20,22 is located on a telecommunications rack slot having an odd slot number, its initial primary bus 24 will be Bus B. If it is in a slot having an even slot number, its initial primary bus 24 will be Bus A. This helps in load sharing and reducing the number of collisions on the control buses 24.

Although the buses 24 are preferably wired-OR buses, upon which collisions are possible, the buses 24 may be other types of buses or the resource processors 18,20,22 might be connected to each other using local area network connections. In any case, even if collisions cannot happen on the buses 24, the load-sharing by division of resource processors 18,20,22 between two communications media is still advantageous in balancing the traffic load therebetween.

The switching module 16 receives the heartbeat response, and after one second has elapsed since sending the heartbeat message, updates the Heartbeat Table to indicate that the new board is ON-LINE. And then sends a PID_CHANGE_BROADCAST_ADDR message to the resource processor 18,20,22 (note this message is mainly used to swap broadcast addresses). The PID_CHANGE_BROADCAST_ADDR message has the following format:

| PROCESSOR ID | PROCESS ID | LENGTH | BUS_ID |
|---|---|---|---|
| UINT1 Slot ID of the resource processor 18,20,22 | UINT1 PID_CHANGE_ BROADCAST_ADDR | UINT2 0x0001 | UINT1 either BUSA or BUSB |

When the resource processor 18,20,22 receives the PID_CHANGE_BROADCAST_ADDR message, it leaves registration mode, and goes into normal operation mode. The resource processor 18,20,22 is then able to transmit all messages.

If the resource processor 18,20,22 does not receive a heartbeat message from the switching module 16, the transmission bus 24 and broadcast address are changed to the other bus 24. If there is no heartbeat message within a second time period, the transmission bus 24 and broadcast address are changed back to the original bus 24, and so on. This bus switching allows the resource processor 18,20,22 to attempt connection on both buses 24 in case one is bad.

Bus and Board Failure Detection. The following bus failure detection method detects individual resource processor 18,20,22 primary bus 24 failure within one time period and individual resource processor 18,20,22 failure within two time periods. A time period is preferably one second, but of course, these time periods can be shortened to any desired time period by increasing the rate of the heartbeat messages from the switching module 16. In one embodiment, the LCOM protocol only assumes board failure, but cannot determine between resource processor board 18,20,22 failure and hot removal.

Thus, when a resource processor 18,20,22 stops responding on both buses according to the test at step 186, LCOM sends CNFG a BOARD_NOT_RESP message at step 188. CNFG must determine if a board has failed or has been removed based on the ONLINE or OFFLINE state of the resource processor 18,20,22.

If the switching module 16 receives responses from all existing resource processors 18,20,22 within a first period, it proceeds assuming that all is well at step 190. But if the switching module 16 does not receive a response from an already-existing resource processor 18,20,22, the switching module 16 assumes that, at the least, that the unresponsive resource processor 18,20,22 has a bad transmit or receive bus driver of its primary bus 24. The Heartbeat Table is updated accordingly at step 184. If the secondary bus 24 is also known bad, a BOARD_NOT_RESP is sent to CNFG at step 188 since no communication with the resource processor 18,20,22 is possible. If the secondary bus 24 is known to be good, the process proceeds to step 189. At step 189, a minor alarm message is sent to the CNFG task on the switching module 16. Also at step 189, a set broadcast address message is sent from the switching module 16 to the unresponsive resource processor 18,20,22 on the secondary bus 24 so that resource processor is communicated with over its secondary bus 24.

If the resource processor 18,20,22 receives the set broadcast address command, the Change Broadcast Address message function will set the broadcast address according to the Bus_Id field of the message. This also swaps the primary and secondary bus 24 (and queue) so that the new primary bus 24 is the old secondary bus 24, and the new secondary bus 24 is the old primary bus 24. This will allow the resource processor 18,20,22 to receive and respond to heartbeats on the known good bus 24.

In cases when the resource processor 18,20,22 is not able to respond to heartbeat messages within the prescribed heartbeat period, preferably one second, the LcomStopResponding function is called. This puts the resource processor 18,20,22 back in registration mode, and sends an LCOM stop responding message to the switching module 16. This tells the switching module 16 to ignore any unresponsiveness of a board. In other words, if the switching module 16 does not get a heartbeat response from the resource processor 18,20,22, no alarms are sent to the CNFG task. The LCOM stop responding message has the following format:

| PROCESSOR ID | PROCESS ID | LENGTH | LCOM MESSAGE TYPE | SLOT ID |
|---|---|---|---|---|
| UINT1 BID_SDM | UINT1 LCMH_ID | UINT2 0x003 | UINT1 0x02 | UINT1 Slot ID of the resource processor 18,20,22 |

Once the unresponsive state has been reached, the switching module 16 behaves as if the resource processor 18,20,22 is not present. Then, when the resource processor 18,20,22 receives and processes an LCOM heartbeat, the resource processor and the switching module 16 behave as if the resource processor 18,20,22 was a hot insertion.

Figure 10:
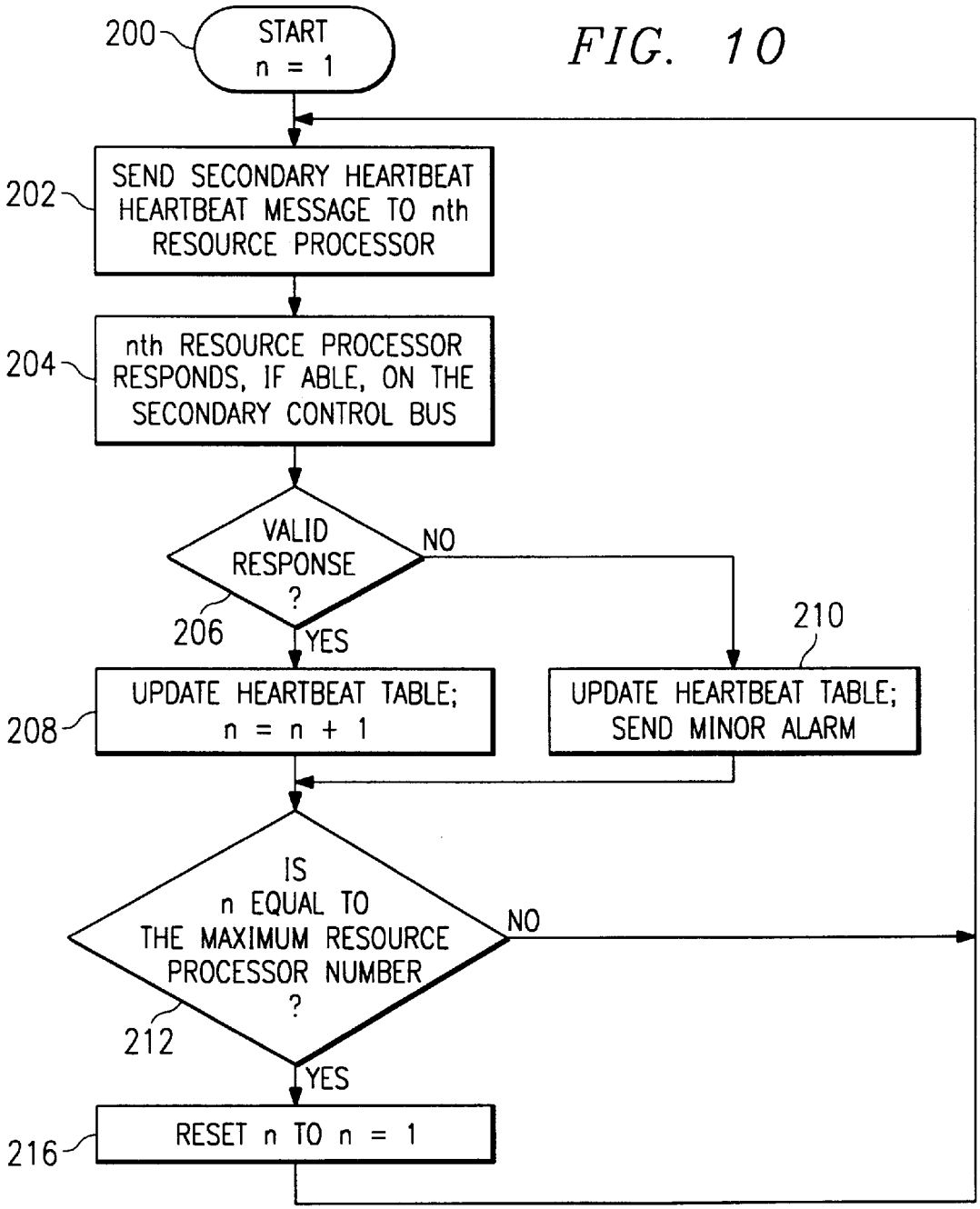
FIG. 10 is a flow diagram of the Secondary Heartbeat Messaging function.

Secondary Heartbeat Messaging. Referring now to FIG. 10, secondary heartbeat messaging is the ONLINE switching module 16 mechanism for detecting a bad secondary bus 24 on a resource processor 18,20,22. This mechanism is important so CNFG can be warned that the secondary bus 24 is bad, so no attempt is made to use this as a primary bus 24. Instead, an operator can then force the suspect board into OFFLINE mode and replace it with another without losing any messages. The secondary bus 24 failure method detects bus failure of secondary buses 24, preferably within twenty heartbeat periods in an embodiment where twenty resource processors 18,20,22 exist on the IOSS platform 27.

During each heartbeat period, the switching module 16 sends a secondary heartbeat message at step 202. This heartbeat message is in addition to the primary heartbeat message, but it is only addressed for one registered resource processor 18,20,22. In one embodiment, the secondary heartbeat message is always sent on the secondary bus 24. Preferably, the secondary heartbeat message has the same format as the primary heartbeat message, which was described above.

At step 204, the resource processor 18,20,22 responds to the secondary heartbeat message the same way it responds to a primary heartbeat message, but it responds on the secondary bus 24. In this embodiment, this is the only message that is sent on the secondary bus 24 from a resource processor 18,20,22. The format of the secondary heartbeat response message is preferably the same as the format of the primary heartbeat response described above.

The switching module 16 preferably responds to the secondary heartbeat response message the same way it responds to a primary heartbeat response message. When the switching module 16 receives a valid heartbeat response message from a resource processor 18,20,22 according to the test step 206, it is distributed to the LCMH task, which updates the Heartbeat Table. The Heartbeat Table is updated at step 208 to indicate the new valid response count and the new bus 24 on which the response was received.

If, after the heartbeat period elapses, the switching module 16 does not receive a response from the resource processor 18,20,22, it is assumed that the unresponsive resource processor 18,20,22 has, at the least, either bad transmit or receive bus 24 driver on its secondary bus 24. Then, at step 210, the Heartbeat Table is updated accordingly and a minor alarm message is sent to CNFG, since communication with the resource processor 18,20,22 is still possible on the primary bus 24.

According to step 212, each period, a different registered resource processor 18,20,22 is addressed until they all have been addressed. When a secondary heartbeat message has been sent to all registered boards, the cycle starts over.

OFFLINE Heartbeat Response Reception. OFFLINE heartbeat response reception is the OFFLINE switching module 16 mechanism for detecting a bad bus 24 on the OFFLINE switching module 16. This mechanism is important so the CNFG task can be warned that a OFFLINE switching module 16 bus is bad, so it will never attempt to use it. The switching module 16 board can then be replaced by an operator without losing any messages. OFFLINE heartbeat response reception allows detection of OFFLINE switching module 16 bus error, preferably within twenty seconds. The OFFLINE Heartbeat Response Reception is also a passive mechanism. No messages are sent to resource processors 18,20,22 from the OFFLINE switching module 16. Instead, the OFFLINE switching module 16 utilizes the resource processors 18,20,22 responses to the ONLINE switching module 16 to determine bus status.

Preferably, within twenty heartbeat periods, the OFFLINE switching module 16 should receive twenty complete sets of primary heartbeat response messages and one or more sets of secondary heartbeat response messages. When the OFFLINE switching module 16 receives a heartbeat response, it is distributed to the LCMH task, which updates the Heartbeat Table.

After the preferred twenty heartbeat periods, the Heartbeat Table is checked. If the table indicates at least one reception of a heartbeat response on bus A and bus B, all is well. The OFFLINE heartbeat response reception begins another cycle, but if the table indicates no receptions on a particular bus 24, then that bus is assumed bad. A warning alarm is sent to the CNFG task to inform it of the bad bus 24.

Heartbeat Table Operation; ONLINE Switching Module 16 Operation. When the switching module 16 becomes ONLINE, if either bus 24 is known bad, the switching module 16 will send a set broadcast address message to all boards using the good bus 24. The set broadcast address message is defined above. This ensures that each resource processor 18,20,22 uses the only good bus as its primary bus 24.

Next all response number fields of the Heartbeat Table are initialized to LCOM_NO_CARD. As responses start coming in, the state will change to indicate the primary bus 24 of each board.

After initialization, the LCMH task periodically resets the Heartbeat Table response number fields to zero and the Heartbeat Table response bus fields to NO_BUS for each resource processor 18,20,22. When a valid heartbeat response message is received from a resource processor 18,20,22, the Heartbeat Table response number field for that board is incremented, indicating a valid reception. The Heartbeat Table bus response field is also updated according to the bus 24 on which the heartbeat response message is received.

The Heartbeat Table state field is updated according to the values of the Heartbeat Table response number and response bus fields.

The Heartbeat State Table holds the heart beat state value for each slot of the system. There are dynamic states which are transient states having a duration of one period and there are static states changing only upon certain events. The following lists possible static and dynamic heartbeat states and descriptions:

| STATIC HEARTBEAT STATE | DESCRIPTION |
|---|---|
| LCOM_FIRST_A | A is primary bus, B is good |
| LCOM_FIRST_B | B is primary bus, A is good |
| LCOM_SECOND_A_P | A is primary bus, B is bad due to primary bus failure |
| LCOM_SECOND_B_P | B is primary bus, A is bad due to primary bus failure |
| LCOM_SECOND_A_S | A is primary bus, B is bad due to secondary bus failure |
| LCOM_SECOND_B_S | B is primary bus, A is bad due to secondary bus failure |
| LCOM_NO_CARD | No card is connected in this slot (Initialization to this at boot) |
| **DYNAMIC HEARBEAT STATE** | **DESCRIPTION** |
| LCOM_GOTO_SECOND_A_P | A becomes primary bus because no response on previous primary bus B. Sends Alarm |
| LCOM_GOTO_SECOND_B_P | B becomes primary bus because no response on previous primary bus A. Sends Alarm |
| LCOM_GOTO_SECOND_A_S | A remains primary bus, but detected secondary bus failure on B. Sends Alarm. |
| LCOM_GOTO_SECOND_B_S | B remains primary bus, but detected secondary bus failure on A. Sends Alarm |
| LCOM_GOTO_FIRST_A_P | A remains primary bus, but bus B which previously had a bus A primary failure is now working. Send clear Alarm |
| LCOM_GOTO_FIRST_B_P | B remains primary bus, but bus A which previously had a bus A primary failure is now working. Send clear Alarm |
| LCOM_GOTO_FIRST_A_S | A remains primary bus, but bus A which previously had a bus B secondary failure is now working. Send clear Alarm |
| LCOM_GOTO_FIRST_B_S | A remains primary bus, but bus A which previously had a bus B secondary failure is now working. Send clear Alarm |
| LCOM_FAILING | Failing beacuse of no response on A or B. Sends BOARD NOT RESP. |
| LCOM_GOTO_FIRST | Received first response from card since boot |

Each slot of the Heartbeat Table state field is preferably updated every heartbeat period. The following events within the heartbeat period induce a change: reception of a Primary Heartbeat Response Message; reception of a Secondary Heartbeat Response Message; no reception of Primary Heartbeat Response Message; and no reception of a Secondary Heartbeat Response Message.

The following state table shows the next state that results from an event occurring during the current state.

| CURRENT STATE | PRIMARY HEARTBEAT RECEPTION | NO PRIMARY HEARTBEAT RECEPTION | SECONDARY HEARTBEAT RECEPTION | NO SECONDARY HEARTBEAT RECEPTION |
|---|---|---|---|---|
| FIRST_A | FIRST_A | GOTO_ SECOND_B_P | FIRST_A | GOTO_ SECOND_A_S |
| FIRST_B | FIRST_B | GOTO_ SECOND_A_P | FIRST_B | GOTO_ SECOND_B_S |
| SECOND_A_P | SECOND_A_P | FAILING | GOTO_ FIRST_A_P | SECOND_A_P |
| SECOND_B_P | SECOND_B_P | FAILING | GOTO_ FIRST_B_P | SECOND_B_P |
| SECOND_A_S | SECOND_A_S | FAILING | GOTO_ FIRST_A_S | SECOND_A_S |
| SECOND_B_S | SECOND_B_S | FAILING | GOTO_ FIRST_B_S | SECOND_B_S |
| NO_CARD | GOTO_FIRST | NO_CARD | NO_CARD | NO_CARD |

The following states cause the following responses, and preferably immediately advance to another state:

| CURRENT STATE | RESPONSE | NEXT STATE |
|---|---|---|
| GOTO_SECOND_B_P | Send an alarm to CNFG that bus A has a primary failure, and send a set broadcast address message to the resource processor 18,20,22. | SECOND_B_P |
| GOTO_SECOND_A_P | Send an alarm to CNFG that bus B has a primary failure, and send a set broadcast address message to the resource processor 18,20,22. | SECOND_A_P |
| GOTO_SECOND_B_S | Send an alarm to CNFG that bus A has a secondary failure. | SECOND_B_S |
| GOTO_SECOND_A_P | Send an alarm to CNFG that bus B has a secondary failure. | SECOND_A_S |
| GOTO_FIRST_B_P | Send an alarm clear to CNFG that bus A has a primary failure. | FIRST_B |
| GOTO_FIRST_A_P | Send an alarm clear to CNFG that bus B has a primary failure. | FIRST_A |
| GOTO_FIRST_B_S | Send an alarm clear to CNFG that bus A has a secondary failure. | FIRST_B |
| GOTO_FIRST_A_S | Send an alarm clear to CNFG that bus B has a secondary failure. | FIRST_A |
| FAILING | Send BOARD_NOT_ RESP to CNFG that resource processor 18,20,22 has failed. | $NO_{13}$CARD |
| GOTO_FIRST | Send a set broadcast address message to the resource processor 18,20,22. The new address corresponds to the bus in Heartbeat Table. | FIRST_A or FIRST_B |

Heartbeat Table Operation; OFFLINE Switching Module 16 Operation. After a period, preferably every twenty seconds, the LCMH task resets the OFFLINE switching module 16 fields of the Heartbeat Table. The Heartbeat Table response number field is set to 0, and the Heartbeat Table response bus field is set to NO_BUS. Then, within preferably twenty periods, when a valid primary or secondary heartbeat response message has not been received from a resource processor 18,20,22 and the Bus_Id of the response does not match the previous Bus_Id, the Heartbeat Table is updated to indicate the new valid response count and the new bus 24 on which the response was received.

Again, after a period, the OFFLINE switching module 16 slot of the Heartbeat Table is updated based on the Heartbeat Table response number and response bus fields. If a bus 24 fails, an alarm is sent to the CNFG task. If both buses 24 fail, a BOARD_NOT_RESP message is sent to the CNFG task. The following shows the state of this entry based on the responses indicated by the latter tables:

| RESPONSES RECEIVED | STATE |
|---|---|
| Responses on bus A and B | LCOM_OFF_NO_FAIL |
| Responses on bus A only | LCOM_OFF_B_FAIL |
| Responses on bus B only | LCOM_OFF_A_FAIL |
| No response | LCOM_OFF_ALL_FAIL |

Also, for each bus 24 with no response, an alarm message is sent to the CNFG task, warning it of existing bad OFFLINE switching module buses.

CNFG interfaces. The LCOM application interfaces with the CNFG task through alarm and board_not_responding messages.

When a resource processor 18,20,22 is not responding on bus A or bus B, LCOM send CNFG a BOARD_NOT_RESP message of the following format:

```
typedef struct
{
MSG_HEADER hdr;
BOARD_NOT_RESP_BODY_T body
} BOARD_NOT_RESP_T;

typedef struct
{
    IUNT2 slot;
} BOARD_NOT_RESP_BODY_T
```

When a bus failure occurs, CNFG is notified through an alarm message. For switching module 16 OFFLINE bus failures, LCOM uses the Report_Alarm function to send the message:

Report_Alarm(UINT2 base_alarm, UINT1 report_status);

The following table describes each OFFLINE switching module 16 LCOM base_alarm:

| BASE ALARM | DESCRIPTION |
|---|---|
| ALM_SDM_LCOM_BUS_A_FAIL | Bus A failed on the switching module 16 OFFLINE board |
| ALM_SDM_LCOM_BUS_B_FAIL | Bus B failed on the switching module 16 OFFLINE board |

For resource processor 18,20,22 bus failures, LCOM uses the Report_Remote_Alarm function to send the message (lci is always INVALID_LCI):

Report_Remote_Alarm(UINT2 base_alarm, UINT1 report_status, UINT1 slot, UINT4 lci);

The following table describes a number of exemplary LCOM base_alarms:

| BASE ALARM | DESCRIPTION |
|---|---|
| ALM_CMN_LCOM_ILLEGAL_PROC_ID | A message with an invalid process id was received by a resource processor 18,20,22. |
| ALM_CMN_LCOM_PRIMARY_BUS_A_FAIL | The switching module 16 failed to receive a primary heartbeat response from an resource processor 18,20,22 on bus A. |
| ALM_CMN_LCOM_PRIMARY_BUS_B_FAIL | The switching module 16 failed to receive a primary heartbeat response from an resource processor 18,20,22 on bus B. |
| ALM_CMN_LCOM_SECONDARY_BUS_A_FAIL | The switching module 16 failed to receive a secondary heartbeat response from an resource processor 18,20,22 on bus A. |
| ALM_CMN_LCOM_SECONDARY_BUS_B_FAIL | The switching module 16 failed to receive a secondary heartbeat response from an resource processor 18,20,22 on bus B. |

There are also some common alarms that can occur on the switching module 16 and the resource processors 18,20,22:

| COMMON BASE ALARM | DESCRIPTION |
|---|---|
| ALM_CMN_LCOM_XMIT_BUF_TIMEOUT | A message transmission timeout occured. |
| ALM_CMN_LCOM_INIT_MEM_FAIL | Unable to initialize the memory for the LCOM receive and transmit queues. |
| ALM_CMN_LCOM_ILLEGAL_HB_STATE | Illegal LCOM state |
| ALM_CMN_LCOM_INT_MSG_LOSS_A | A message was lost on bus A probably due to receive data overrun. |
| ALM_CMN_LCOM_INT_MSG_LOSS_B | A message was lost in bus B probably due to receive data overrun. |
| ALM_CMN_LCOM_INT_NO_MSG_BUF | A message was lost due to lack of message storage buffers. |
| ALM_CMN_LCOM_INVALID_MSG_LENGTH | An attempt to send a message that exceeds the maximum length allowed. |

Described above are a system and method for providing a switching module and switching functions in a telecommunications switching platform. The switching module is capable of sending heartbeat messages and identifying other elements within the telecommunications switching platform as operational over one bus or both buses of a redundant-pair control bus. The module also has a reprogrammable, nonvolatile memory associated with from which it can run its operating system. The module can also transfer the operating system into another memory, allowing it to make updates to the operating system stored in the nonvolatile memory without interrupting its execution of its run-time operating code.

A few preferred embodiments have been described in detail hereinabove. It is to be understood that the scope of the invention also comprehends embodiments different from those described, yet within the scope of the claims.

For example, the terms "controller," "processing circuitry," and "control circuitry" comprehend ASICs (application specific integrated circuits), PAL (programmable array logic), PLAs (programmable logic arrays), decoders, memories, non-software based processors, or other circuitry, or digital computers including microprocessors and microcomputers of any architecture, or combinations thereof. Memory devices include Flash memory, SRAM (static random access memory), DRAM (dynamic random access memory), pseudo-static RAM, latches, EEPROM (electrically-erasable programmable read-only memory), EPROM (erasable programmable read-only memory), registers, or other memory devices known in the art. Words of inclusion are to be interpreted as nonexhaustive in considering the scope of the invention.

Aspects of the claimed invention may be applied to switching systems for GSM mobile switches, PCS mobile switches, or in switches primarily used for switching land-based circuits. The telecommunications circuits described in the preferred embodiment were generally E1 or T1 spans, but aspects of the invention could be applied to platforms that switch lower- or higher-bandwidth circuits such as T-2, T-3, or SONET. Also, aspects of the invention could be applied to switch circuits of bandwidths generally equivalent to E1 or T1 but having different framing formats.

Implementation is contemplated in discrete components or fully integrated circuits in silicon, gallium arsenide, or other electronic materials families, as well as in optical-based or other technology-based forms and embodiments. It should be understood that various embodiments of the invention can employ or be embodied in hardware, software or microcoded firmware.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A switching module for use in a telecommunications switching platform for switching information channels borne on telecommunications signals connected to said telecommunications switching platform, said switching module comprising:

a control bus interface connected to a control bus within said telecommunications switching platform;

a controller connected to said control bus interface, said controller operable to communicate with other elements in said telecommunications switching platform through said control bus interface, said controller further operable to transmit a primary heartbeat message as a part of said communication with said other elements and to receive a primary heartbeat response sent by said other elements in response to said primary heartbeat message.

2. The switching module of claim 1 wherein said primary heartbeat response includes data sufficient to identify the other element in said telecommunications switching platform from which said heartbeat response was transmitted.

3. The switching module of claim 2 and further comprising a memory in which said switching module is operable to store a table of resources known to exist in the telecommunications switching platform.

4. The switching module of claim 3 wherein said controller is further operable to compare said data sufficient to identify said other element to said table of known resources to determine whether the existence of said element had previously been detected by a previous heartbeat response.

5. The switching module of claim 4 wherein said controller is operable to add the identity of said identified other element to said table of known resources if said identity is not already registered within said table.

6. The switching module of claim 3 wherein said controller is further operable to check said table of known resources to determine if other previously-known resources failed to respond to said heartbeat message.

7. The switching module of claim 6 wherein said controller is further operable to update said table of known resources to indicate whether there was a response by a previously-known resource.

8. The switching module of claim 1 wherein said control bus is a pair of redundant control buses.

9. The switching module of claim 8 wherein said primary heartbeat message and said primary heartbeat response are transmitted and received through one of said pair of redundant control buses and wherein said switching module is further operable to transmit through said control bus interface a secondary heartbeat message, which is transmitted by said control bus interface through the other of said pair of redundant control buses.

10. The switching module of claim 8 wherein said switching module communicates with a plurality of other elements in the telecommunications switching platform, and wherein said switching module sends primary heartbeat messages to and receives primary heartbeat responses from a first group of said plurality of other elements over a first bus of said pair and primary heartbeat messages to and primary heartbeat responses from a second group of said plurality of other elements over a second bus of said pair.

11. The switching module of claim 10 wherein said switching module is operable to send and receive secondary heartbeat messages and responses to and from said second group of said plurality of other elements over said first bus and to send and receive secondary heartbeat messages and responses to and from said first group of said plurality of other elements over said second bus.

12. The switching module of claim 11 wherein at least one of said secondary heartbeat messages contains addressing information sufficient to particularly identify the element within said telecommunications switching platform for which said secondary heartbeat message is intended.

13. The switching module of claim 12 wherein said switching module sends a plurality of said secondary heartbeat messages, thereby periodically, individually addressing a plurality of other elements within said telecommunications switching platform.

14. The switching module of claim 12 wherein said secondary heartbeat messages are sent to one of said other elements in said telecommunications switching platform when said switching module has failed to receive a primary heartbeat response from said other element.

15. A switching module for use in a telecommunications switching platform for switching information channels borne on telecommunications signals connected to said telecommunications switching platform, said switching module comprising:

a control bus interface connected to a redundant pair of control buses within said telecommunications switching platform; and a module controller connected to said control bus interface, said module controller operable to communicate with other elements in said telecommunications switching platform through said control bus interface, said module controller further operable: to transmit primary heartbeat messages to a first group of a plurality of other elements within the telecommunications switching platform over a first bus of said redundant control buses and to receive primary heartbeat responses from said first group over said first bus; to transmit primary heartbeat messages to a second group of said plurality of other elements over a second bus of said redundant control buses and receive primary heartbeat responses from said second group over said second bus.

16. The switching module of claim 15 wherein said control bus interface is further operable to transmit secondary heartbeat messages to and receive secondary heartbeat responses from said first group over said second bus and to transmit secondary heartbeat messages to and receive secondary heartbeat responses from said second group over said first bus.

17. The switching module of claim 16 wherein each of said primary heartbeat responses and said secondary heartbeat responses contain information sufficient to identify from which of the other elements within the telecommunications switching platform said responses have originated, and wherein said switching module is operable to parse such information from said responses.

18. The switching module of claim 17 wherein said switching module is operable to compare the identities parsed from said primary and secondary heartbeat responses and compare said identities to a table of known resources to determine whether the existence of the other elements from which said responses originated had previously been known within said telecommunications switching platform.

19. The switching module of claim 18 wherein said controller is operable to add the identity of said identified other element to said table of known resources if said identity is not already registered within said table.

20. The switching module of claim 17 wherein said controller is further operable to check said table of known resources to determine if other previously-known resources failed to respond to said heartbeat message.

21. The switching module of claim 20 wherein said controller is further operable to update said table of known resources to indicate that there was no response from a previously-known resource.

22. The system of claim 16 wherein said secondary heartbeat messages comprise addressing sufficient to identify to which of said other elements in said telecommunications switching platform said secondary heartbeat messages are intended and wherein said controller sends a plurality of said secondary heartbeat messages, thereby periodically, individually addressing each of said plurality of resources.

23. A switching module for use in a telecommunications switching platform for switching information channels borne on telecommunications signals connected to said telecommunications switching platform, said switching module comprising:

a nonvolatile memory;

another memory;

a local communications controller operable to communicate with other elements in said telecommunications switching platform through a control bus; and a module controller connected to said nonvolatile memory, said another memory, and said local communications controller, said module controller operable to control the operation of said switching module, said module controller further operable: to perform operations according to instructions stored in said nonvolatile memory; to effect the transfer of instructions from said nonvolatile memory to said another memory; to perform other operations according to instructions stored in said another memory; and to effect the loading of new operating instructions from the telecommunication switching platform's higher-level applications into said nonvolatile memory through said local communications controller.

24. The switching module of claim 23 wherein said module controller is operable to effect said loading of new operating instructions at substantially the same time as said module controller is performing said other operations according to instructions stored in said another memory.

25. The switching module of claim 24 wherein said module controller is operable to effect said loading of new operating instructions substantially without interruption of its operation according to instruction stored in said another memory.

26. The switching module of claim 24 wherein said new operating instructions are downloaded from higher-level elements in the telecommunications switching platform and wherein said operating instructions are uniquely identified by the format of the download of said operating instructions.

27. The switching module of claim 26 wherein said download of said operating instructions includes a header identifying the module and process within the telecommunications switching platform on which said operating instructions are to run.

* * * * *